US012681362B2

(12) United States Patent
Okuno et al.

(10) Patent No.: US 12,681,362 B2
(45) Date of Patent: Jul. 14, 2026

(54) IMAGING APPARATUS, CAMERA MODULE, AND CONTROL METHOD FOR IMAGING APPARATUS

(71) Applicant: ALPS ALPINE CO., LTD., Tokyo (JP)

(72) Inventors: Touichi Okuno, Tokyo (JP); Kiyoto Sato, Miyagi (JP); Hiroshi Osada, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 219 days.

(21) Appl. No.: 18/768,514

(22) Filed: Jul. 10, 2024

(65) Prior Publication Data

US 2024/0361670 A1 Oct. 31, 2024

Related U.S. Application Data

(63) Continuation of application No. PCT/JP2023/000662, filed on Jan. 12, 2023.

(30) Foreign Application Priority Data

Jan. 17, 2022 (JP) ................................. 2022-005275

(51) Int. Cl.
    *G03B 13/36* (2021.01)
    *F03G 7/06* (2006.01)
    (Continued)

(52) U.S. Cl.
    CPC ......... *G03B 13/36* (2013.01); *F03G 7/06143* (2021.08); *G02B 27/646* (2013.01);
    (Continued)

(58) Field of Classification Search
    CPC .. G03B 13/36; G03B 5/00; G03B 2205/0007; G03B 2205/0076; G03B 3/10;
    (Continued)

(56) References Cited

U.S. PATENT DOCUMENTS

| | | | |
|---|---|---|---|
| 2010/0045139 A1* | 2/2010 | Yoshida | H02N 2/067 |
| | | | 310/317 |
| 2012/0194929 A1* | 8/2012 | Nakahira | G02B 7/04 |
| | | | 359/823 |

(Continued)

FOREIGN PATENT DOCUMENTS

| | | |
|---|---|---|
| JP | 2013-546023 | 12/2013 |
| JP | 2019-525048 | 9/2019 |

(Continued)

OTHER PUBLICATIONS

International Search Report for PCT/JP2023/000662 mailed on Feb. 28, 2023.

*Primary Examiner* — Mohammed A Hasan
(74) *Attorney, Agent, or Firm* — IPUSA, PLLC

(57) ABSTRACT

An imaging apparatus includes a fixed member including a fixed base; a movable member that is movable relative to the fixed member, the movable member including a lens holder configured to hold a lens body so as to face an imaging element; a first shape memory alloy wire; a second shape memory alloy wire; a first conductive path; a second conductive path; a common conductive path; and a driver configured to be electrically connected to the first conductive path, the second conductive path, and the common conductive path, and supply a current to the first shape memory alloy wire and the second shape memory alloy wire and drive the first shape memory alloy wire and the second shape memory alloy wire.

7 Claims, 25 Drawing Sheets

(51) Int. Cl.
    G02B 27/64        (2006.01)
    G03B 5/00         (2021.01)

(52) U.S. Cl.
    CPC ........ G03B 5/00 (2013.01); *G03B 2205/0007*
                (2013.01); *G03B 2205/0076* (2013.01)

(58) Field of Classification Search
    CPC ... G03B 30/00; F03G 7/06143; G02B 27/646;
              G02B 7/04; G02B 7/08; H04N 23/50;
                                  H04N 23/57
    USPC ........................................................ 359/823
    See application file for complete search history.

(56)                     References Cited

U.S. PATENT DOCUMENTS

| | | | |
|---|---|---|---|
| 2013/0300880 A1 | 11/2013 | Brown et al. | |
| 2017/0357076 A1 | 12/2017 | Scheele et al. | |
| 2018/0149142 A1* | 5/2018 | Bunting | F03G 7/06145 |

FOREIGN PATENT DOCUMENTS

| JP | 2019525048 A | * | 9/2019 | | G02B 7/023 |
|---|---|---|---|---|---|
| WO | 2021/023150 | | 2/2021 | | |
| WO | WO-2021023150 A1 | * | 2/2021 | | H04N 23/67 |

\* cited by examiner

FIG.9

IMAGING APPARATUS, CAMERA MODULE, AND CONTROL METHOD FOR IMAGING APPARATUS

CROSS-REFERENCE TO RELATED APPLICATIONS

This application is a continuation application of International Application No. PCT/JP2023/000662, filed on Jan. 12, 2023, and designated the U.S., which is based upon and claims priority to Japanese Patent Application No. 2022-005275, filed on Jan. 17, 2022, the entire contents of which are incorporated herein by reference.

BACKGROUND

1. Field of the Invention

The present disclosure relates to imaging apparatuses, camera modules, and control methods for imaging apparatuses.

2. Description of the Related Art

An imaging apparatus using eight shape memory alloy wires is known in Japanese Laid-Open Patent Application No. 2013-546023. According to this imaging apparatus, a control circuit utilizes a pulse width modulation (PWM) signal and individually supply a current to each of the eight shape memory alloy wires for heating and shrinking, thereby moving a lens holder connected to the eight shape memory alloy wires.

SUMMARY

An imaging apparatus according to an embodiment of the present disclosure includes: a fixed member including a fixed base; a movable member that is movable relative to the fixed member, the movable member including a lens holder configured to hold a lens body so as to face an imaging element; a first shape memory alloy wire in which one end of the first shape memory alloy wire is fixed to the fixed member and another end of the first shape memory alloy wire is fixed to the movable member; a second shape memory alloy wire in which one end of the second shape memory alloy wire is fixed to the fixed member and another end of the second shape memory alloy wire is fixed to the movable member; a first conductive path that is provided at the fixed base and electrically connected to the one end of the first shape memory alloy wire; a second conductive path that is provided at the fixed base and electrically connected to the one end of the second shape memory alloy wire; a common conductive path that is electrically connected to the another end of the first shape memory alloy wire and the another end of the second shape memory alloy wire; and a driver configured to be electrically connected to the first conductive path, the second conductive path, and the common conductive path, and supply a current to the first shape memory alloy wire and the second shape memory alloy wire and drive the first shape memory alloy wire and the second shape memory alloy wire. A portion connecting a first point and a second point on the first conductive path and a portion connecting a first point and a second point on the second conductive path are disposed to extend side by side in the fixed base. The first point on the first conductive path is disposed side by side with the first point on the second conductive path. The second point on the first conductive path is disposed side by side with the second point on the second conductive path. The driver is configured to perform switching between a first mode, a second mode, and a third mode. The first mode is a mode in which the first conductive path, the first shape memory alloy wire, the common conductive path, the second shape memory alloy wire, and the second conductive path are electrically connected in series, thereby supplying a current to the first shape memory alloy wire and the second shape memory alloy wire, and causing the current to flow from the first point of the first conductive path to the second point of the first conductive path and causing the current to flow from the second point of the second conductive path to the first point of the second conductive path. The second mode is a mode in which the first conductive path, the first shape memory alloy wire, and the common conductive path are electrically connected in series, thereby supplying a current to the first shape memory alloy wire and causing the current to flow through the first conductive path. The third mode is a mode in which the second conductive path, the second shape memory alloy wire, and the common conductive path are electrically connected in series, thereby supplying a current to the second shape memory alloy wire and causing the current to flow through the second conductive path. The imaging apparatus is configured to perform the first mode in combination with the second mode, the third mode, or both.

BRIEF DESCRIPTION OF THE DRAWINGS

FIG. 9 is a diagram illustrating a configuration example of a driver and a controller;

DETAILED DESCRIPTION OF THE DISCLOSURE

In the existing imaging apparatus as described above, the control circuit controls a drive circuit in a manner as to simultaneously form a conductive path used for causing a predetermined current to flow through a single heating target wire of the eight shape memory alloy wires, and conductive paths connected in parallel that are used for dividing a predetermined current into seven and causing the divided seven currents to flow through the remaining seven wires of the eight shape memory alloy wires. With this configuration, the control circuit can appropriately heat and shrink a single specific shape memory alloy wire.

However, the existing imaging apparatus as described above has a risk that a relatively large magnetic field (induced magnetic field) may be formed around the conductive path used for causing the current to the single heating target wire. The formed relatively large magnetic field may become a source of noise for an imaging element, and adversely influence the quality of an image formed by the imaging element.

In view of the above, it is desirable to provide an imaging apparatus that can reduce the magnitude of the magnetic field formed around the conductive path used for supplying the current to the shape memory alloy wire.

Figure 1:
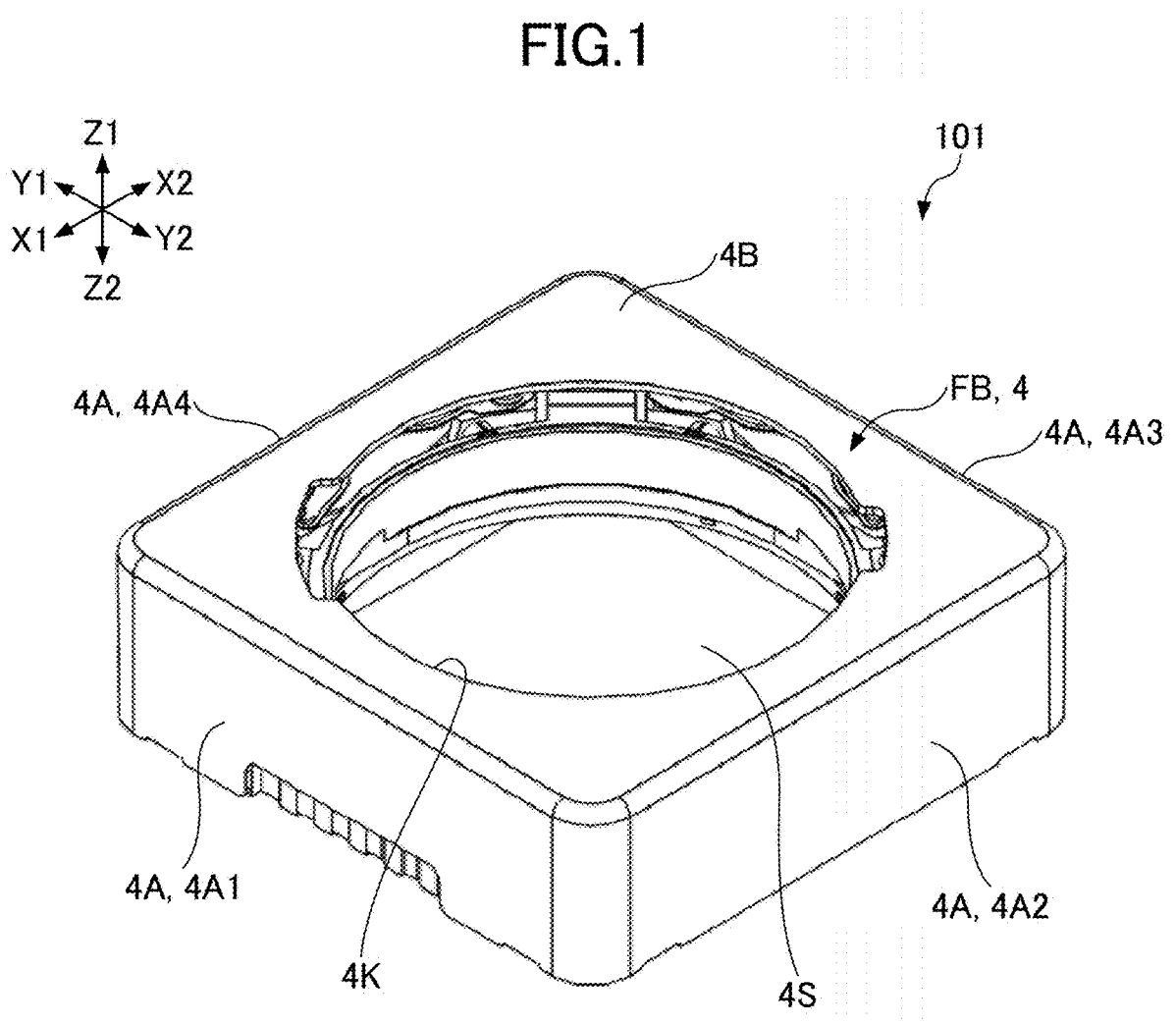
FIG. 1 is a perspective view of an imaging apparatus.
Figure 2:
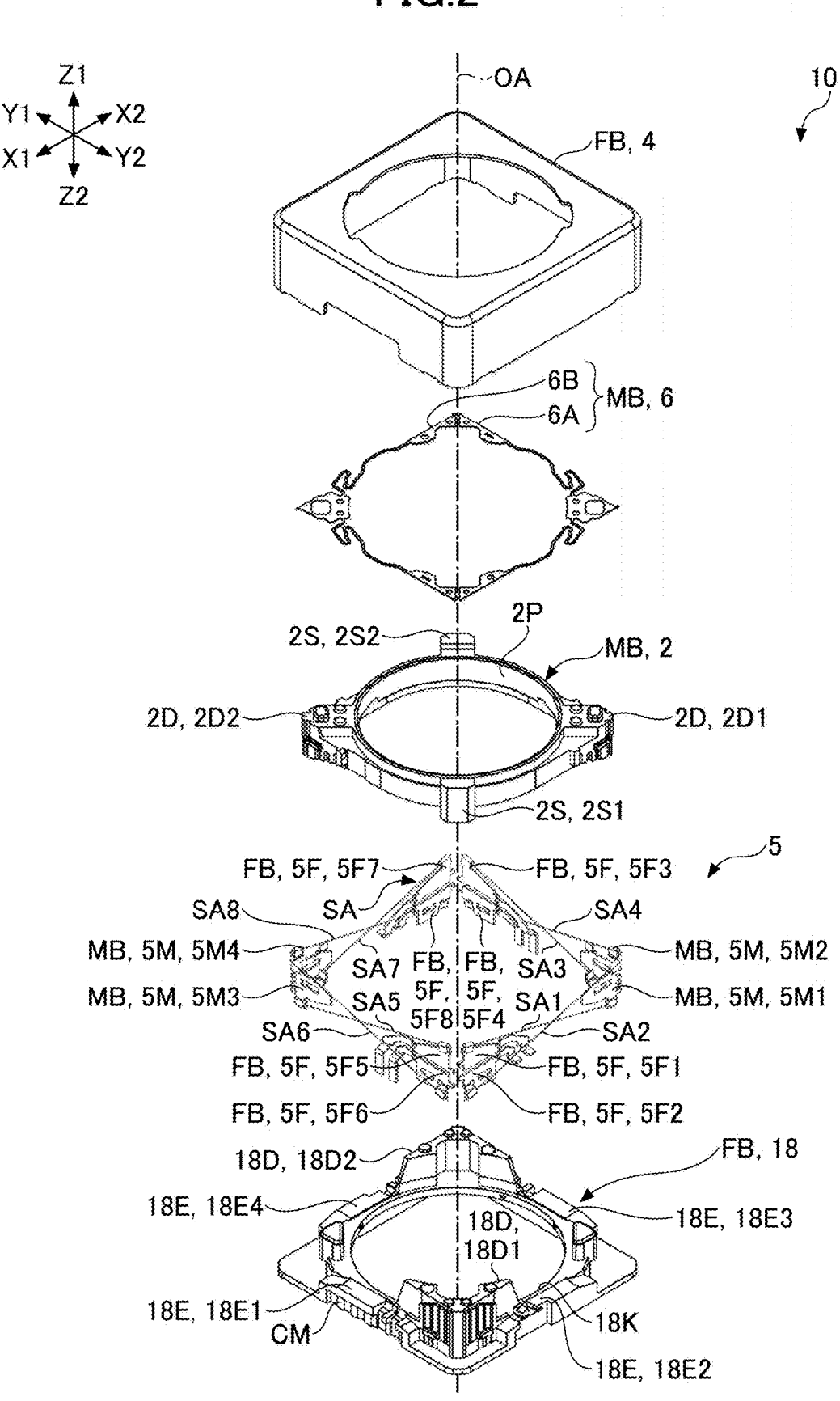
FIG. 2 is an exploded perspective view of the imaging apparatus.

Hereinafter, an imaging apparatus 101 (lens actuator) according to an embodiment of the present disclosure will be described with reference to the drawings. FIG. 1 is a perspective view of the imaging apparatus 101. FIG. 2 is an exploded perspective view of the imaging apparatus 101.

In FIGS. 1 and 2, X1 denotes one direction of an X-axis forming a three-dimensional orthogonal coordinate system, and X2 denotes the other direction of the X-axis. Y1 denotes one direction of a Y-axis forming the three-dimensional orthogonal coordinate system, and Y2 denotes the other direction of the Y-axis. Similarly, Z1 denotes one direction of a Z-axis forming the three-dimensional orthogonal coordinate system, and Z2 denotes the other direction of the Z-axis. In FIGS. 1 and 2, an X1-side of the imaging apparatus 101 corresponds to a forward side (front surface side) of the imaging apparatus 101, and an X2-side of the imaging apparatus 101 corresponds to a rearward side (rear surface side) of the imaging apparatus 101. A Y1-side of the imaging apparatus 101 corresponds to a left side of the imaging apparatus 101, and a Y2-side of the imaging apparatus 101 corresponds to a right side of the imaging apparatus 101. A Z1-side of the imaging apparatus 101 corresponds to an upper side (subject side) of the imaging apparatus 101, and a Z2-side of the imaging apparatus 101 corresponds to a lower side (imaging element side) of the imaging apparatus 101. The same applies in other drawings.

As illustrated in FIGS. 1 and 2, the imaging apparatus 101 includes a cover member 4 that is a part of a fixed member FB.

The cover member 4 is configured to function as a casing that covers the other members. In the present embodiment, the cover member 4 is formed of a non-magnetic metal. However, the cover member 4 may be formed of a magnetic metal. The cover member 4 defines a housing portion 4S as illustrated in FIG. 1.

The cover member 4 includes: an outer peripheral wall 4A that is rectangular and cylindrical; and an upper plate 4B that is provided so as to be continuous with an upper end of the outer peripheral wall 4A (end on the Z1 side) and is rectangular and flat. A circular opening 4K is formed at the center of the upper plate 4B. The outer peripheral wall 4A includes a first side plate 4A1 to a fourth side plate 4A4. The first side plate 4A1 and the third side plate 4A3 face each other, and the second side plate 4A2 and the fourth side plate 4A4 face each other. The first side plate 4A1 and the third side plate 4A3 extend perpendicular to the second side plate 4A2 and the fourth side plate 4A4.

As illustrated in FIG. 2, a lens holder 2, a metal member 5, a leaf spring 6, a base member 18, a shape memory alloy wire SA, and the like are housed in the cover member 4.

A movable member MB includes the lens holder 2 configured to hold an unillustrated lens body, and the leaf spring 6 configured to support the lens holder 2 so as to be movable along an optical axis OA. The lens body is, for example, a cylindrical lens barrel provided with at least one lens, and a center axis thereof is along the optical axis OA.

The lens holder 2 is formed through injection molding of a synthetic resin, such as a liquid crystal polymer (LCP) or the like. Specifically, as illustrated in FIG. 2, the lens holder 2 includes: a cylindrical portion 2P formed to extend along the optical axis OA; and a movable base 2D and a projection 2S that are formed to project outward of the cylindrical portion 2P in a radial direction. In the present embodiment, the lens body is configured to be fixed with an adhesive to the inner circumferential surface of the cylindrical portion 2P.

The movable base 2D includes a first movable base 2D1 and a second movable base 2D2. The first movable base 201 and the second movable base 2D2 are disposed to project in opposite directions across the optical axis OA. Similarly, the projection 2S includes a first projection 2S1 and a second projection 2S2. The first projection 2S1 and the second projection 252 are disposed to project in opposite directions across the optical axis OA. Specifically, the movable bases 2D and the projections 2S are disposed to correspond to the four corners of the lens holder 2 having an approximately rectangular outer shape in a top view, and are arranged alternately. A part of the leaf spring 6 is placed at each of the two movable bases 2D.

The shape memory alloy wire SA is an example of a shape memory actuator. In the present embodiment, the shape memory alloy wire SA includes a first wire SA1 to an eighth wire SA8. In response to flowing of a current, the shape memory alloy wire SA increases in temperature and shrinks as a result of the increase in temperature. By utilizing the shrinkage of the shape memory alloy wire SA, the imaging apparatus 101 can move the lens holder 2 upward and downward along the optical axis OA. In the present embodiment, the lens holder 2 is moved in response to shrinkage of one or more of the first wire SA1 to the eighth wire SA8 of the shape memory alloy wire SA, and the other one or more of the first wire SA1 to the eighth wire SA8 of the shape memory alloy wire SA are stretched in response to the movement of the lens holder 2.

The leaf spring 6 is configured to be electrically connected to the shape memory alloy wire SA via the metal member 5. In the present embodiment, the leaf spring 6 is formed of a metal plate mainly formed of a copper alloy, a titanium-copper-based alloy (titanium-copper), or a copper-nickel alloy (nickel-tin-copper), or the like. Specifically, the leaf spring 6 includes a first leaf spring 6A and a second leaf spring 6B.

The base member 18 (fixed base) is formed through injection molding using a synthetic resin, such as a liquid crystal polymer (LCP) or the like. In the present embodiment, the base member 18 has an approximately rectangular profile in a top view, and has an opening 18K at the center. Specifically, the base member 18 has four side portions 18E (first side portion 18E1 to fourth side portion 18E4) disposed to enclose the opening 18K.

The leaf spring 6 is configured to connect the movable base 2D formed in the lens holder 2 with a fixed base 18D formed in the base member 18. The fixed base 18D includes a first fixed base 18D1 and a second fixed base 18D2.

More specifically, the first leaf spring 6A connects the first movable base 201 formed at the lens holder 2 with the first fixed base 18D1 and the second fixed base 18D2 that are formed at the base member 18. Similarly, the second leaf spring 6B connects the second movable base 2D2 formed at the lens holder 2 with the first fixed base 18D1 and the second fixed base 18D2 that are formed at the base member 18.

The metal member 5 is configured such that the ends of the shape memory alloy wire SA are fixed to the metal member 5. In the present embodiment, the metal member 5 includes a fixed metal member 5F and a movable metal member 5M. The fixed metal member 5F forms a part of the fixed member FB and is fixed to the fixed base 18D of the base member 18. The movable metal member 5M forms a part of the movable member MB and is fixed to the movable base 2D of the lens holder 2.

More specifically, the fixed metal member 5F is also referred to as a fixed terminal plate, and includes a first fixed terminal plate 5F1 to an eighth fixed terminal plate 5F8. The movable metal member 5M is also referred to as a movable terminal plate, and includes a first movable terminal plate 5M1 to a fourth movable terminal plate 5M4.

Figure 3A:
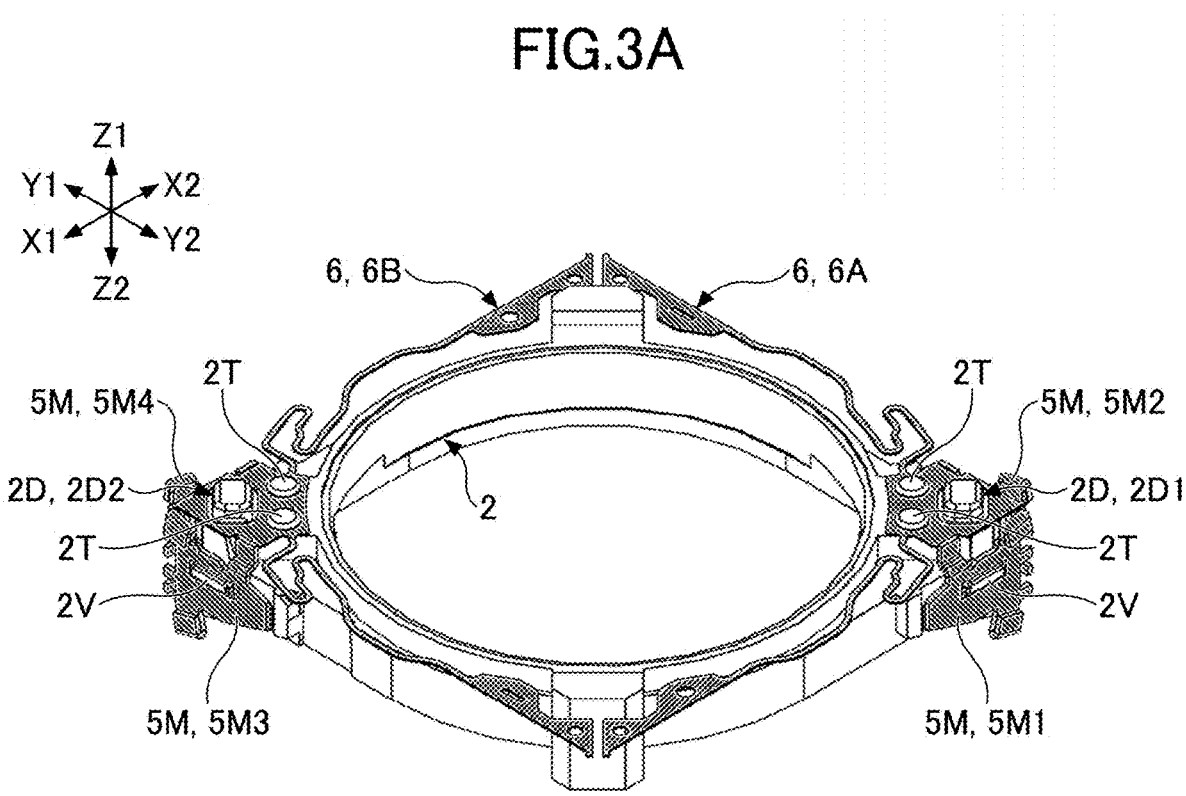
FIG. 3A is a perspective view of a lens holder to which a movable metal member and a leaf spring are attached.
Figure 3B:
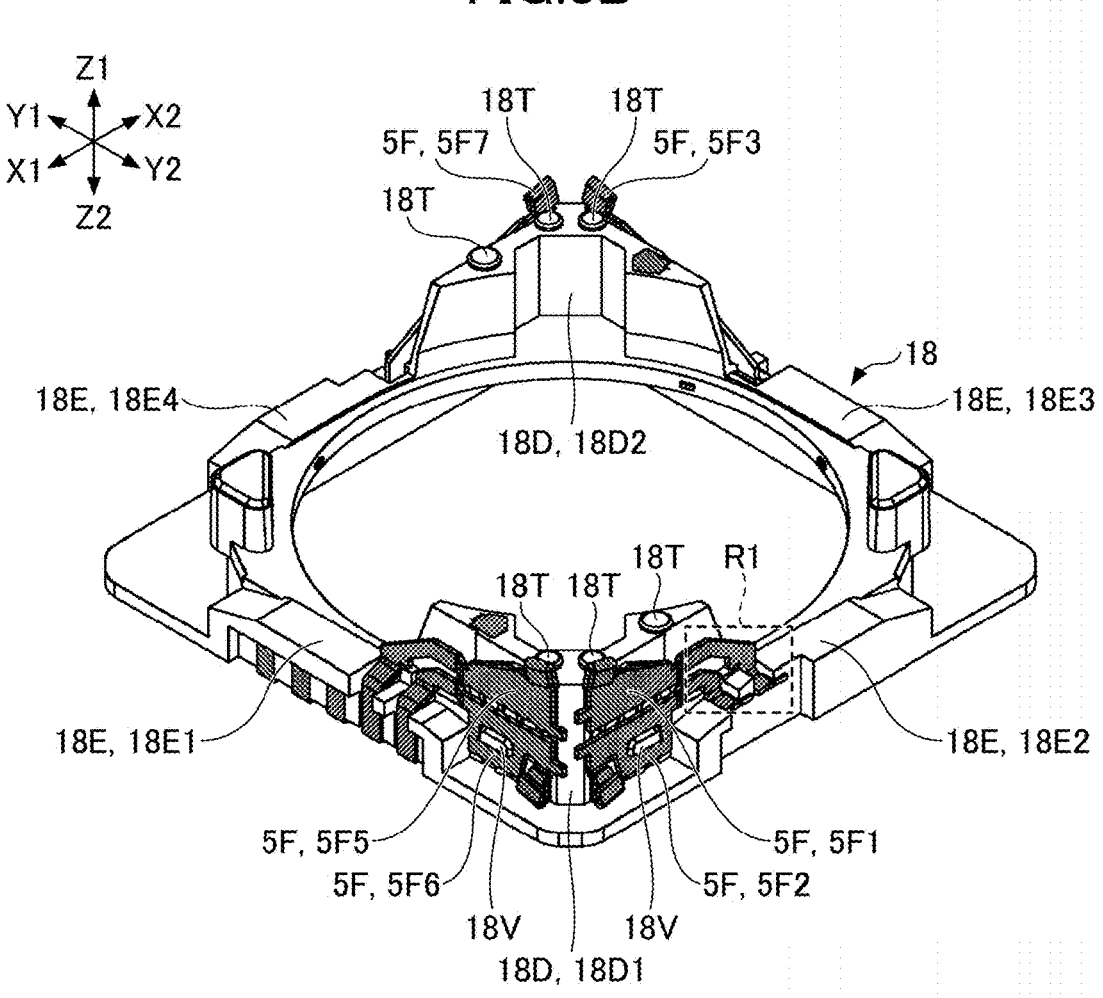
FIG. 3B is a perspective view of a base member to which a fixed metal member is attached.

Next, a positional relationship between: each of the lens holder 2 and the base member 18; and the metal member 5 will be described with reference to FIGS. 3A and 3B. FIG. 3A is a perspective view of the lens holder 2 to which the movable metal member 5M (movable terminal plate) and the leaf spring 6 are attached. FIG. 3B is a perspective view of the base member 18 to which the fixed metal member 5F (fixed terminal plate) is attached. For clarification, the movable metal member 5M and the leaf spring 6 in FIG. 3A are shown with a dot pattern, and the fixed metal member 5F in FIG. 3B is shown with a dot pattern.

In the example as illustrated in FIG. 3A, the first movable terminal plate 5M1 is fixed to a side wall of the first movable base 201 on the Y2 side (right attachment surface). Specifically, the first movable terminal plate 5M1 is fixed with an adhesive to the first movable base 201 in a state in which a rectangular projection 2V that projects outward (Y2-side) and is formed at the first movable base 2D1 is engaged with a rectangular hole AH (see FIG. 4A) formed in the first movable terminal plate 5M1. The adhesive is a photocurable adhesive or the like. The photocurable adhesive is a UV-curable adhesive, a visible light-curable adhesive, or the like. Similarly, the second movable terminal plate 5M2 is fixed to a side wall of the first movable base 2D1 on the X2 side (rear attachment surface), a third movable terminal plate 5M3 is fixed to a side wall of the second movable base 2D2 on the X1 side (front attachment surface), and a fourth movable terminal plate 5M4 is fixed to a side wall of the second movable base 2D2 on the Y1 side (left attachment surface).

In the example as illustrated in FIG. 3B, the first fixed terminal plate 5F1 and the second fixed terminal plate 5F2 are fixed to a side wall of the first fixed base 18D1 on the Y2 side (right attachment surface) disposed along a second side portion 18E2 of the base member 18. Specifically, the first fixed terminal plate 5F1 and the second fixed terminal plate 5F2 are fixed to the first fixed base 18D1 with an adhesive. More specifically, the second fixed terminal plate 5F2 is fixed to the first fixed base 18D1 with an adhesive in a state in which a rectangular projection 18V that projects outward (Y2-side) and is formed in the first fixed base 18D1 is engaged with a through-hole RH (see FIG. 4A) formed in a second fixed terminal plate 5F2. The adhesive is a photo-curable adhesive or the like. The photocurable adhesive is a UV-curable adhesive, a visible light-curable adhesive, or the like. Similarly, a third fixed terminal plate 5F3 and a fourth fixed terminal plate 5F4 (invisible in FIG. 3B) are fixed to a side wall of the second fixed base 18D2 on the X2 side (rear attachment surface) disposed along a third side portion 18E3 of the base member 18. A fifth fixed terminal plate 5F5 and a sixth fixed terminal plate 5F6 are fixed to a side wall of the first fixed base 18D1 on the X1 side (front attachment surface) disposed along the first side portion 18E1 of the base member 18. A seventh fixed terminal plate 5F7 and an eighth fixed terminal plate 5F8 (invisible in FIG. 3B) are fixed to a side wall of the second fixed base 18D2 on the Y1 side (left attachment surface) disposed along the fourth side portion 18E4 of the base member 18.

The shape memory alloy wire SA extends along the inner surface of the outer peripheral wall 4A of the cover member 4, and is configured to support the movable member MB so as to be movable relative to the fixed member FB. In the present embodiment, the shape memory alloy wire SA includes the first wire SA1 to the eighth wire SA8, and is configured to support the lens holder 2 serving as the movable member MB so as to be movable relative to the base member 18 serving as the fixed member FB. As illustrated in FIG. 2, one end of each of the first wire SA1 to the eighth wire SA8 is fixed to the fixed metal member 5F through crimping, welding, or the like, and the other end thereof is fixed to the movable metal member 5M through crimping, welding, or the like.

Figure 4A:
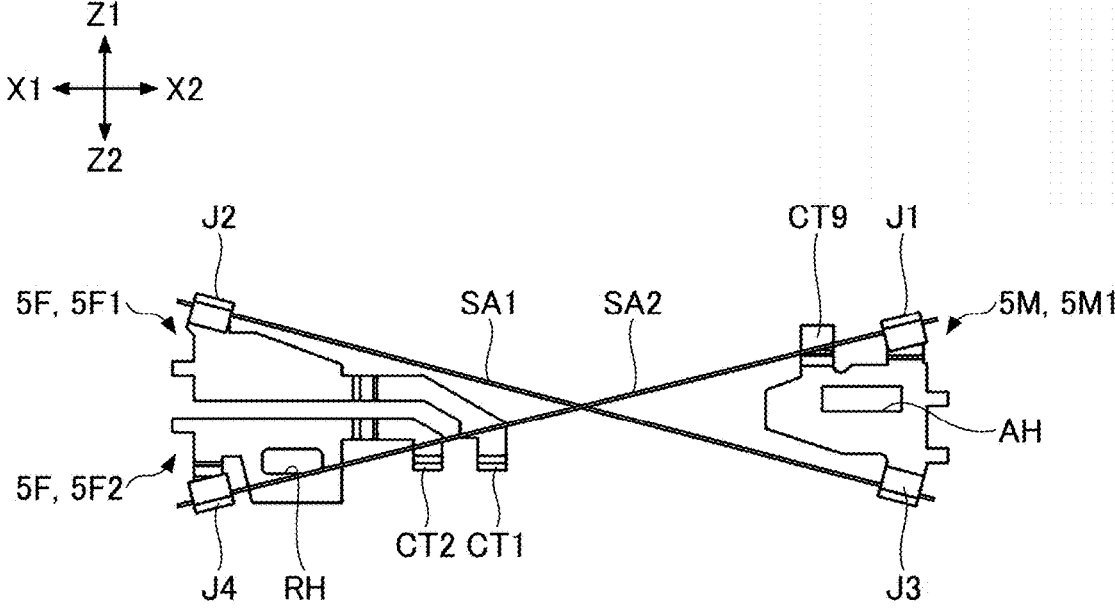
FIG. 4A is a side view of a metal member to which shape memory alloy wires are attached.
Figure 4B:
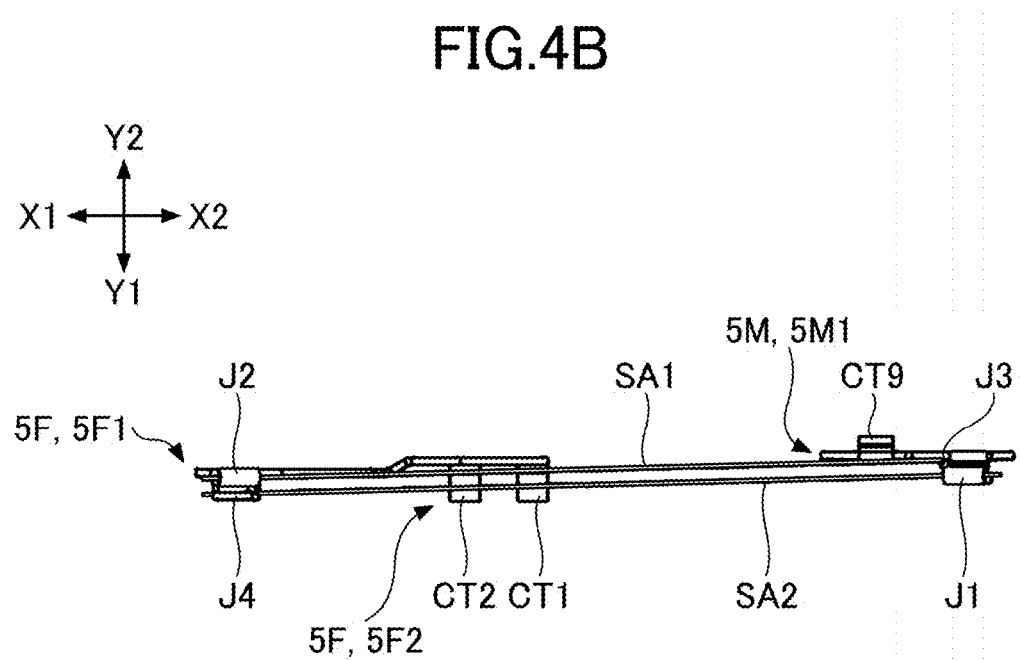
FIG. 4B is an upper view of the metal member to which the shape memory alloy wires are attached.

Next, the metal member 5 to which the shape memory alloy wire SA is attached will be described with reference to FIGS. 4A and 4B. FIG. 4A is a view, as seen from the Y2 side, of: the first wire SA1 attached to the first movable terminal plate 5M1 and the first fixed terminal plate 5F1; and the second wire SA2 attached to the first movable terminal plate 5M1 and the second fixed terminal plate 5F2. FIG. 4B is a view, as seen from the Z1 side, of: the first wire SA1 attached to the first movable terminal plate 5M1 and the first fixed terminal plate 5F1; and the second wire SA2 attached to the first movable terminal plate 5M1 and the second fixed terminal plate 5F2. The positional relationship between the members as illustrated in FIGS. 4A and 4B corresponds to a positional relationship between the members of the imaging apparatus 101 that is assembled. In FIGS. 4A and 4B, for clarification, illustration of the other members is omitted. The following description to be made with reference to FIGS. 4A and 4B relates to a combination of the first wire SA and the second wire SA2. However, the same applies to a combination of the third wire SA3 and the fourth wire SA4, a combination of the fifth wire SA5 and the sixth wire SA6, and a combination of the seventh wire SA7 and the eighth wire SA8.

Specifically, one end of the first wire SA1 is fixed to the first movable terminal plate 5M1 at a lower holding portion J3 of the first movable terminal plate 5M1, and the other end of the first wire SA1 is fixed to the first fixed terminal plate 5F1 at a holding portion J2 of the first fixed terminal plate 5F1. Similarly, one end of the second wire SA2 is fixed to the first movable terminal plate 5M1 at an upper holding portion J1 of the first movable terminal plate 5M1, and the other end of the second wire SA2 is fixed to the second fixed terminal plate 5F2 at a holding portion J4 of the second fixed terminal plate 5F2.

The holding portion J1 is formed by bending a part of the first movable terminal plate 5M1. Specifically, the part of the first movable terminal plate 5M1 is bent in a state of holding one end of the second wire SA2, thereby forming the holding portion J1. That end of the second wire SA2 is fixed to the holding portion J1 through welding. The same applies to the holding portions J2 to J4.

As illustrated in FIGS. 4A and 4B, the first wire SA1 and the second wire SA2 are disposed so as to be at a skew position. That is, the first wire SA1 and the second wire SA2 are disposed so as not to contact each other (i.e., so as to be in non-contact).

Figure 5:
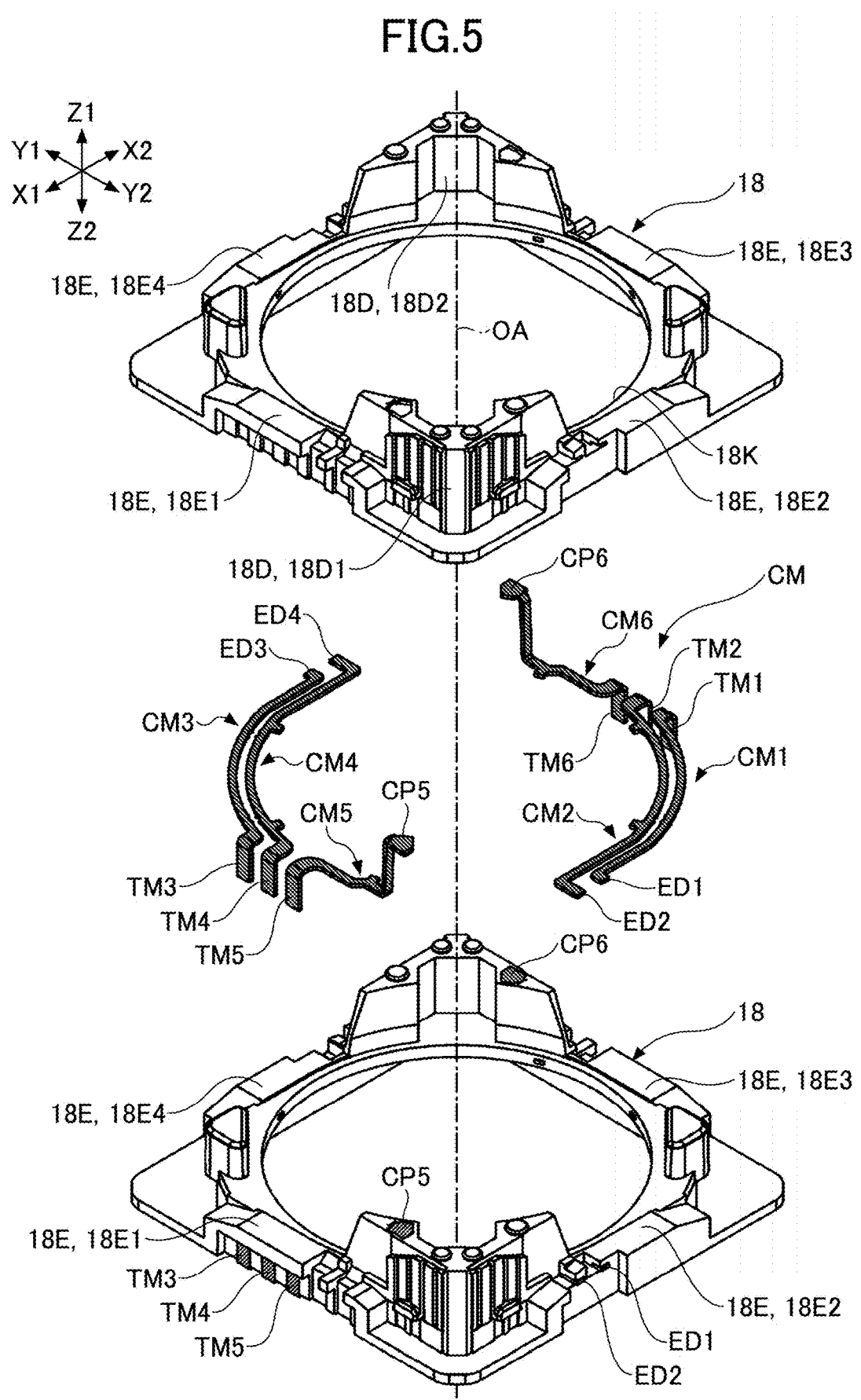
FIG. 5 is a perspective view of a base member.

Next, the base member 18 that is a part of the fixed member FB will be described in detail with reference to FIG. 5. FIG. 5 is a perspective view of the base member 18. Specifically, the upper view of FIG. 5 is a perspective view of the base member 18 with a conductive member CM removed, the central view of FIG. 5 is a perspective view of the conductive member CM embedded in the base member 18, and the lower view of FIG. 5 is a perspective view of the base member 18 with the conductive member CM embedded. In the central and lower views of FIG. 5, for clarification, the conductive member CM is shown with a dot pattern.

The base member 18 functions as a wire support configured to support one end of each of the first wire SA1 to the eighth wire SA8. With this configuration, the movable member MB is supported by the first wire SA1 to the eighth wire SA8 in a state of being movable in a Z-axis direction, i.e., a direction parallel to the optical axis OA.

A fixed base 18D is formed on an upper surface of the base member 18, i.e., a surface of the base member 18 on the subject side (a surface on the Z1 side). The fixed base 18D includes the first fixed base 18D1 and the second fixed base 18D2. The first fixed base 18D1 and the second fixed base 18D2 are disposed to face each other across the optical axis OA.

The conductive member CM as illustrated in the central view of FIG. 5 is embedded in the base member 18 through insert molding. The conductive member CM is formed of a metal plate including a material, such as copper, iron, an alloy mainly including these, or the like. In the present embodiment, the conductive member CM includes a first terminal portion TM1 to a sixth terminal portion TM6, and a fifth joint surface portion CP5 and a sixth joint surface portion CP6. The first terminal portion TM1 to the sixth terminal portion TM6 are exposed from a forward surface (X1-side surface) and a rearward surface (X2-side surface) of the base member 18 and extend downward (Z2-direction). The fifth joint surface portion CP5 and the sixth joint surface portion CP6 are exposed to the upper surface (Z1-side surface) of the base member 18.

Specifically, the conductive member CM includes a first conductive member CM1 to a sixth conductive member CM6. The first conductive member CM1 includes the first terminal portion TM1 and a first connection portion ED1. The second conductive member CM2 includes the second terminal portion TM2 and a second connection portion ED2. The third conductive member CM3 includes the third terminal portion TM3 and a third connection portion ED3. The fourth conductive member CM4 includes the fourth terminal portion TM4 and a fourth connection portion ED4. The fifth conductive member CM5 includes the fifth terminal portion TM5 and the fifth junction surface portion CP5. The sixth conductive member CM6 includes the sixth terminal portion TM6 and the sixth junction surface portion CP6.

The first terminal portion TM1, the second terminal portion TM2, and the sixth terminal portion TM6 are disposed along the third side portion 18E3 of the base member 18. The third terminal portion TM3 to the fifth terminal portion TM5 are disposed along the first side portion 18E1 of the base member 18.

The first connection portion ED1 of the first conductive member CM1 is disposed along the second side portion 18E2 of the base member 18, and the first terminal portion TM1 of the first conductive member CM1 is disposed along the third side portion 18E3 of the base member 18 rather than the second side portion 18E2 of the base member 18. Similarly, the second connection portion ED2 of the second conductive member CM2 is disposed along the second side portion 18E2 of the base member 18, and the second terminal portion TM2 of the second conductive member CM2 is disposed along the third side portion 18E3 of the base member 18 rather than the second side portion 18E2 of the base member 18.

The third connection portion ED3 of the third conductive member CM3 is disposed along the fourth side portion 18E4 of the base member 18, and the third terminal portion TM3 of the third conductive member CM3 is disposed along the first side portion 18E1 of the base member 18 rather than the fourth side portion 18E4 of the base member 18. Similarly, the fourth connection portion ED4 of the fourth conductive member CM4 is disposed along the fourth side portion 18E4 of the base member 18, and the fourth terminal portion TM4 of the fourth conductive member CM4 is disposed along the first side portion 18E1 of the base member 18 rather than the fourth side portion 18E4 of the base member 18.

In this manner, the first terminal portion TM1 to the sixth terminal portion TM6 are disposed along the first side portion 18E1 or the third side portion 18E3 of the base member 18, and are not disposed along the second side portion 18E2 and the fourth side portion 18E4 of the base member 18. This is because of facilitating mounting of the imaging element. Specifically, a flexible printed circuit board or the like connected to the imaging element is disposed by passing under the second side portion 18E2 of the base member 18, the fourth side portion 18E4 of the base member 18, or both.

Figure 6A:
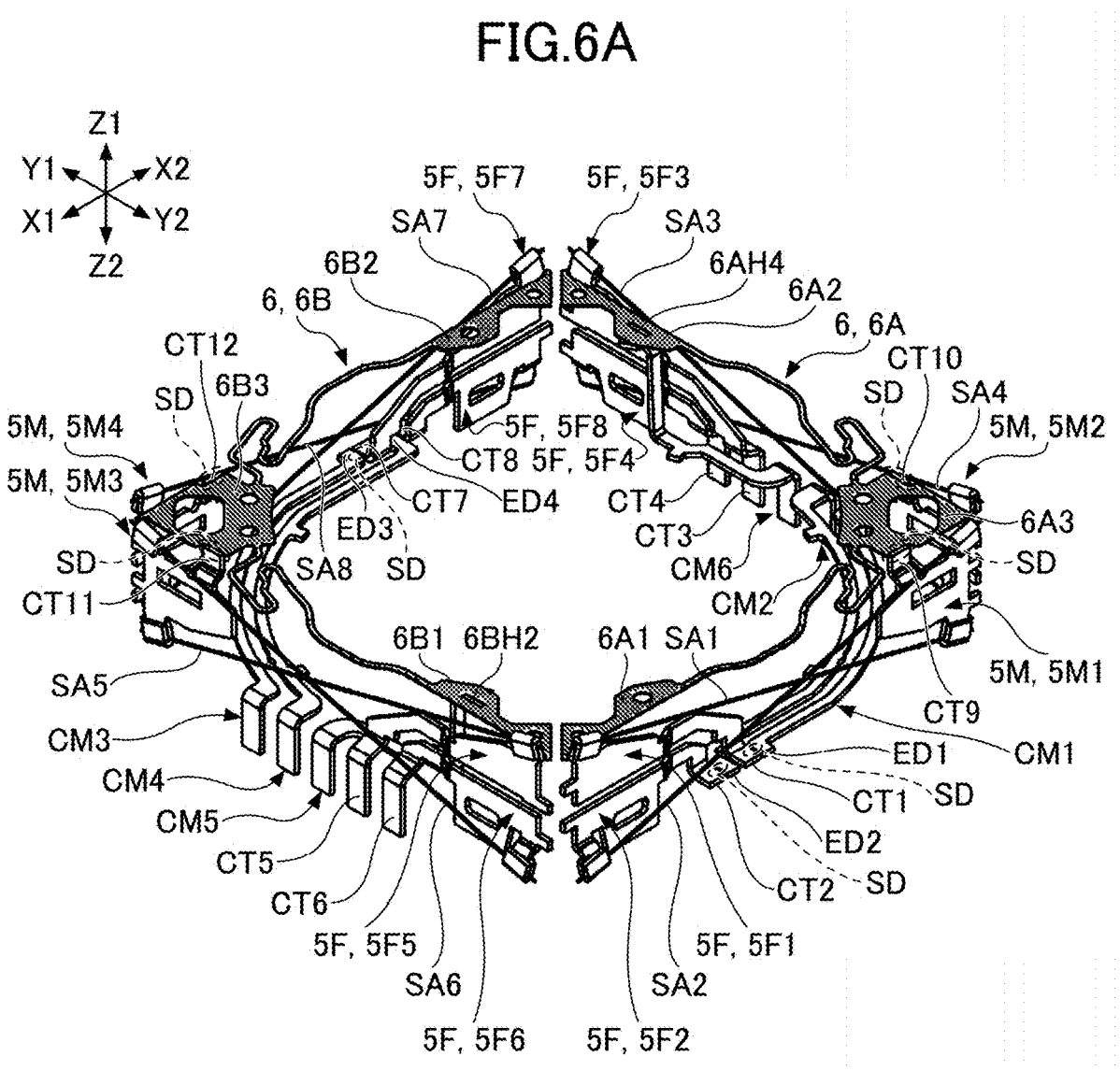
FIG. 6A is a view illustrating a positional relationship between the leaf spring, the shape memory alloy wires, the metal member, and a conductive member.
Figure 6B:
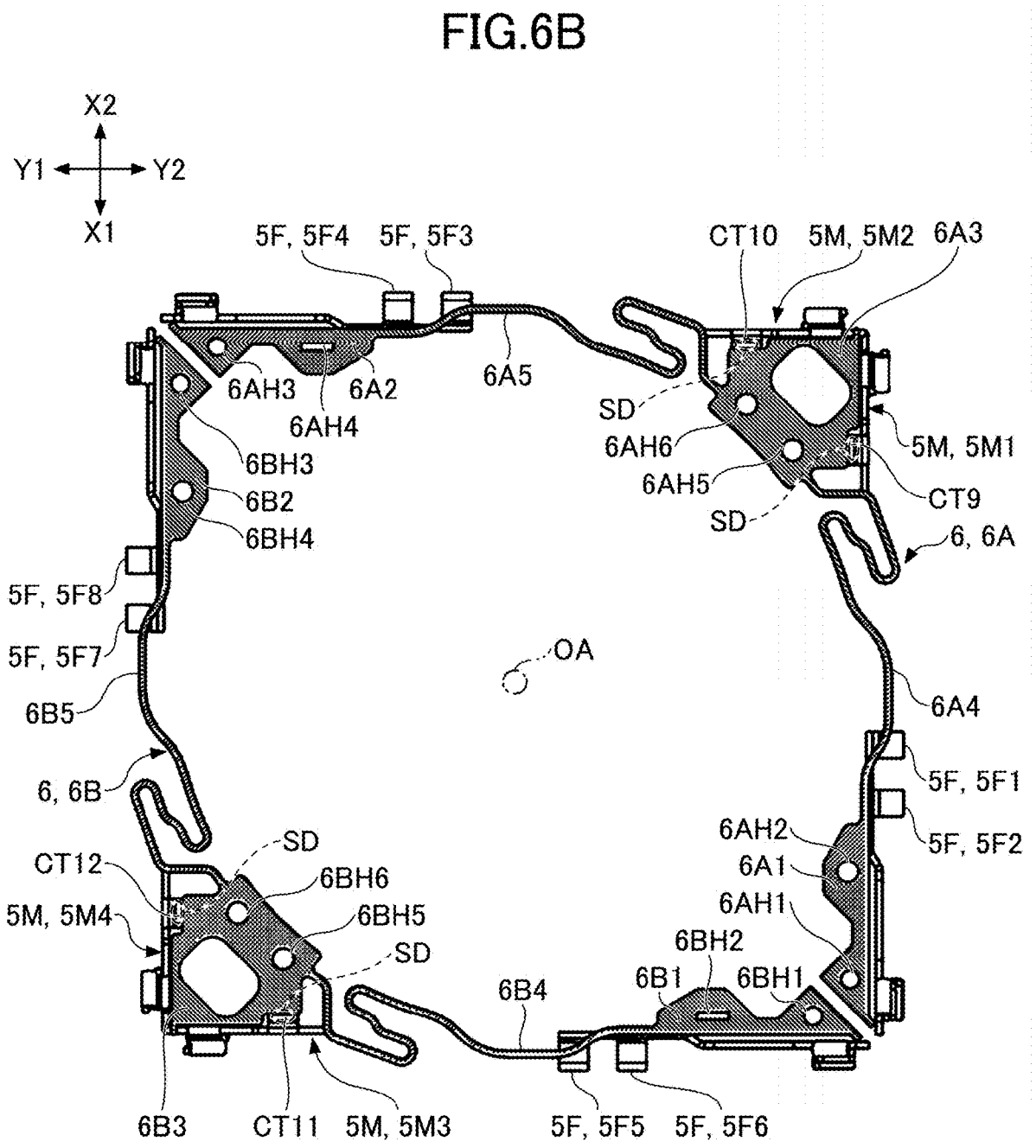
FIG. 6B is a view illustrating a positional relationship between the leaf spring and the metal member.

Next, the positional relationship between the leaf spring 6, the shape memory alloy wire SA, the metal member 5, and the conductive member CM will be described with reference to FIGS. 6A and 6B. FIGS. 6A and 6B are views illustrating the positional relationship between the leaf spring 6, the shape memory alloy wire SA, the metal member 5, and the conductive member CM. Specifically, FIG. 6A is a perspective view illustrating the metal member 5, the leaf spring 6, the shape memory alloy wire SA, and the conductive member CM. FIG. 6B is a top view illustrating the positional relationship between the metal member 5 and the leaf spring 6. In FIG. 6B, for clarification, illustration of the shape memory alloy wire SA and the conductive member CM is omitted. In FIGS. 6A and 6B, for clarification, the leaf spring 6 is shown with a dot pattern.

As illustrated in FIG. 6B, the leaf spring 6 includes the first leaf spring 6A and the second leaf spring 6B. The first leaf spring 6A includes: a first portion 6A1 to be fixed to the first fixed base 18D1 (see FIG. 2) of the base member 18; a second portion 6A2 to be fixed to the second fixed base 18D2 (see FIG. 2) of the base member 18; a third portion 6A3 to be fixed to the first movable base 2D1 (see FIG. 2) of the lens holder 2; a fourth portion 6A4 connecting the first portion 6A1 and the third portion 6A3; and a fifth portion 6A5 connecting the second portion 6A2 and the third portion 6A3.

The first portion 6A1 is provided with a first through-hole 6AH1 and a second through-hole 6AH2 through which round projections 18T projecting upward (see FIG. 3B) formed in the first fixed base 18D1 are to be inserted. In the present embodiment, bonding between the leaf spring 6 and the projections 18T is achieved by treating the projections 18T through heat caulking or cold caulking. However, the bonding between the leaf spring 6 and the projections 18T may be achieved with an adhesive.

The second portion 6A2 is provided with: a third through-hole 6AH3 through which the round projection 18T projecting upward (see FIG. 3B) formed in the second fixed base 18D2 is to be inserted; and a fourth through-hole 6AH4 used for bonding to the sixth joint surface portion CP6 (see the lower view of FIG. 5) of the sixth conductive member CM6. In the present embodiment, bonding between the leaf spring 6 and the conductive member CM is achieved through welding, such as laser welding or the like. However, the bonding between the leaf spring 6 and the conductive member CM may be achieved with a solder, a conductive adhesive, or the like.

The third portion 6A3 is provided with a fifth through-hole 6AH5 and a sixth through-hole 6AH6 through which the round projections 2T projecting upward (see FIG. 3A) formed in the first movable base 2D1 are to be inserted. In the present embodiment, the bonding between the leaf spring 6 and the projections 2T is achieved by treating the projections 2T through heat caulking or cold caulking. However, the bonding between the leaf spring 6 and the projections 2T may be achieved with an adhesive.

Similarly, the second leaf spring 6B includes a first portion 6B1 to be fixed to the first fixed base 18D1 (see FIG. 2) of the base member 18; a second portion 6B2 to be fixed to the second fixed base 18D2 (see FIG. 2) of the base member 18; a third portion 6B3 to be fixed to the second movable base 2D2 (see FIG. 2) of the lens holder 2; a fourth portion 6B4 connecting the first portion 6B1 and the third portion 6B3; and a fifth portion 6B5 connecting the second portion 6B2 and the third portion 6B3.

The first portion 6B1 is provided with: a first through-hole 6BH1 through which the round projection 18T projecting upward (see FIG. 3B) formed in the first fixed base 18D1 is to be inserted; and a second through-hole 6BH2 used for bonding to the fifth joint surface portion CP5 (see the lower view of FIG. 5) of the fifth conductive member CM5.

The second portion 6B2 is provided with a third through-hole 6BH3 and a fourth through-hole 6BH4 through which the round projections 18T projecting upward (see FIG. 3B) formed in the second fixed base 18D2 are to be inserted.

The third portion 6B3 is provided with a fifth through-hole 6BH5 and a sixth through-hole 6BH6 through which the round projections 2T projecting upward (see FIG. 3A) formed in the second movable base 2D2 are to be inserted.

The fourth portion 6A4 and the fifth portion 6A5 of the first leaf spring 6A, and the fourth portion 6B4 and the fifth portion 6B5 of the second leaf spring 6B are elastically deformable arms including multiple bent portions. Therefore, the lens holder 2 is movable relative to the base member 18 (fixed member FB) not only in the direction parallel to the optical axis OA but also in the direction crossing the optical axis OA.

As illustrated in FIG. 6B, the first leaf spring 6A and the second leaf spring 6B have approximately the same shape. Specifically, the first leaf spring 6A and the second leaf spring 6B are configured so as to be in a two-fold rotational symmetry with respect to the optical axis OA. Therefore, this configuration can reduce the number of parts of the imaging apparatus 101. Also, the first leaf spring 6A and the second leaf spring 6B can support the lens holder 2 in air in a well-balanced manner. Also, the leaf spring 6 does not adversely influence the weight balance of the movable member MB supported by the eight shape memory alloy wires SA (the first wire SA1 to the eighth wire SA8).

As illustrated in FIG. 6A, the first connection portion ED1 of the first conductive member CM1 is bonded with a bonding material SD to a first contact portion CT1 of the first fixed terminal plate 5F1 next to the first connection portion ED1. The bonding material SD is a solder, a conductive adhesive, or the like. Specifically, the first connection portion ED1 and the first contact portion CT1 are bonded in a state in which surfaces thereof are approximately parallel to each other. Similarly, the second connection portion ED2 of the second conductive member CM2 is bonded with the bonding material SD to a second contact portion CT2 of a second fixed terminal plate 5F2 next to the second connection portion ED2. The third connection portion ED3 of the third conductive member CM3 is bonded with the bonding material SD to a seventh contact portion CT7 of a seventh fixed terminal plate 5F7 next to the third connection portion ED3. The fourth connection portion ED4 of the fourth conductive member CM4 is bonded with the bonding material SD to an eighth contact portion CT8 of the eighth fixed terminal plate 5F8 next to the fourth connection portion ED4. In FIGS. 6A and 6B, for clarification, the bonding material SD is shown with a dashed-line circle.

As illustrated in FIGS. 6A and 6B, a ninth contact portion CT9 of the first movable terminal plate 5M1 is vertically bonded with the bonding material SD to the third portion 6A3 of the first leaf spring 6A. That is, the ninth contact portion CT9 and the third portion 6A3 are bonded in a state in which surfaces thereof are approximately perpendicular to each other. Similarly, a tenth contact portion CT10 of the second movable terminal plate 5M2 is vertically bonded with the bonding material SD to the third portion 6A3 of the first leaf spring 6A. An eleventh contact portion CT11 of the third movable terminal plate 5M3 is vertically bonded with the bonding material SD to the third portion 6B3 of the second leaf spring 6B. A twelfth contact portion CT12 of the fourth movable terminal plate 5M4 is vertically bonded with the bonding material SD to the third portion 6B3 of the second leaf spring 6B.

Meanwhile, as illustrated in FIG. 6B, the first fixed terminal plate 5F1 is disposed apart from the first portion 6A1 of the first leaf spring 6A, and does not contact the first portion 6A1 of the first leaf spring 6A. Similarly, the third fixed terminal plate 5F3 does not contact the second portion 6A2 of the first leaf spring 6A. The fifth fixed terminal plate 5F5 does not contact the first portion 6B1 of the second leaf spring 6B. The seventh fixed terminal plate 5F7 does not contact the second portion 6B2 of the second leaf spring 6B.

The fifth joint surface CP5 (see the central view of FIG. 5) of the fifth conductive member CM5 is bonded through welding (e.g., laser welding or the like) to the first portion 6B1 of the second leaf spring 6B in parallel thereto at the second through-hole 6BH2 formed in the first portion 6B1 of the second leaf spring 6B. That is, the fifth joint surface portion CP5 and the first portion 6B1 are bonded in a state in which surfaces thereof are approximately parallel to each other. Similarly, the sixth joint surface portion CP6 (see the central view of FIG. 5) of the sixth conductive member CM6 is bonded through welding (e.g., laser welding or the like) to the second portion 6A2 of the first leaf spring 6A in parallel thereto at the fourth through-hole 6AH4 formed in the second portion 6A2 of the first leaf spring 6A.

Next, the path of the current flowing through the shape memory alloy wire SA will be described with reference to FIGS. 7A to 7F. FIGS. 7A to 7F are partial views of the configuration as illustrated in FIG. 6A. In FIGS. 7A to 7F, for clarification, members through which the current flows are shown with a dot pattern. Specifically, in FIG. 7A, the first conductive member CM1 and the second conductive member CM2 are shown with a rough dot pattern, and the first movable terminal plate 5M1, the first fixed terminal plate 5F1, and the second fixed terminal plate 5F2 are shown with a fine dot pattern. Also, in FIG. 7B, the first conductive member CM1 and the sixth conductive member CM6 are shown with a rough dot pattern, the first leaf spring 6A is shown with a fine dot pattern, and the first movable terminal plate 5M1 and the first fixed terminal plate 5F1 are shown with a finer dot pattern. Also, in FIG. 7C, the second conductive member CM2 and the sixth conductive member CM6 are shown with a rough dot pattern, the first leaf spring 6A is shown with a fine dot pattern, and the first movable terminal plate 5M1 and the second fixed terminal plate 5F2 are shown with a finer dot pattern. Also, in FIG. 7D, the second movable terminal plate 5M2, the third fixed terminal plate 5F3, and the fourth fixed terminal plate 5F4 are shown with a fine dot pattern. Also, in FIG. 7E, the sixth conductive member CM6 is shown with a rough dot pattern, the first leaf spring 6A is shown with a fine dot pattern, and the second movable terminal plate 5M2 and the third fixed terminal plate 5F3 are shown with a finer dot pattern. Also, in FIG. 7F, the sixth conductive member CM6 is shown with a rough dot pattern, the first leaf spring 6A is shown with a fine dot pattern, and the second movable terminal plate 5M2 and fourth fixed terminal plate 5F4 are shown with a finer dot pattern.

Figure 7A:
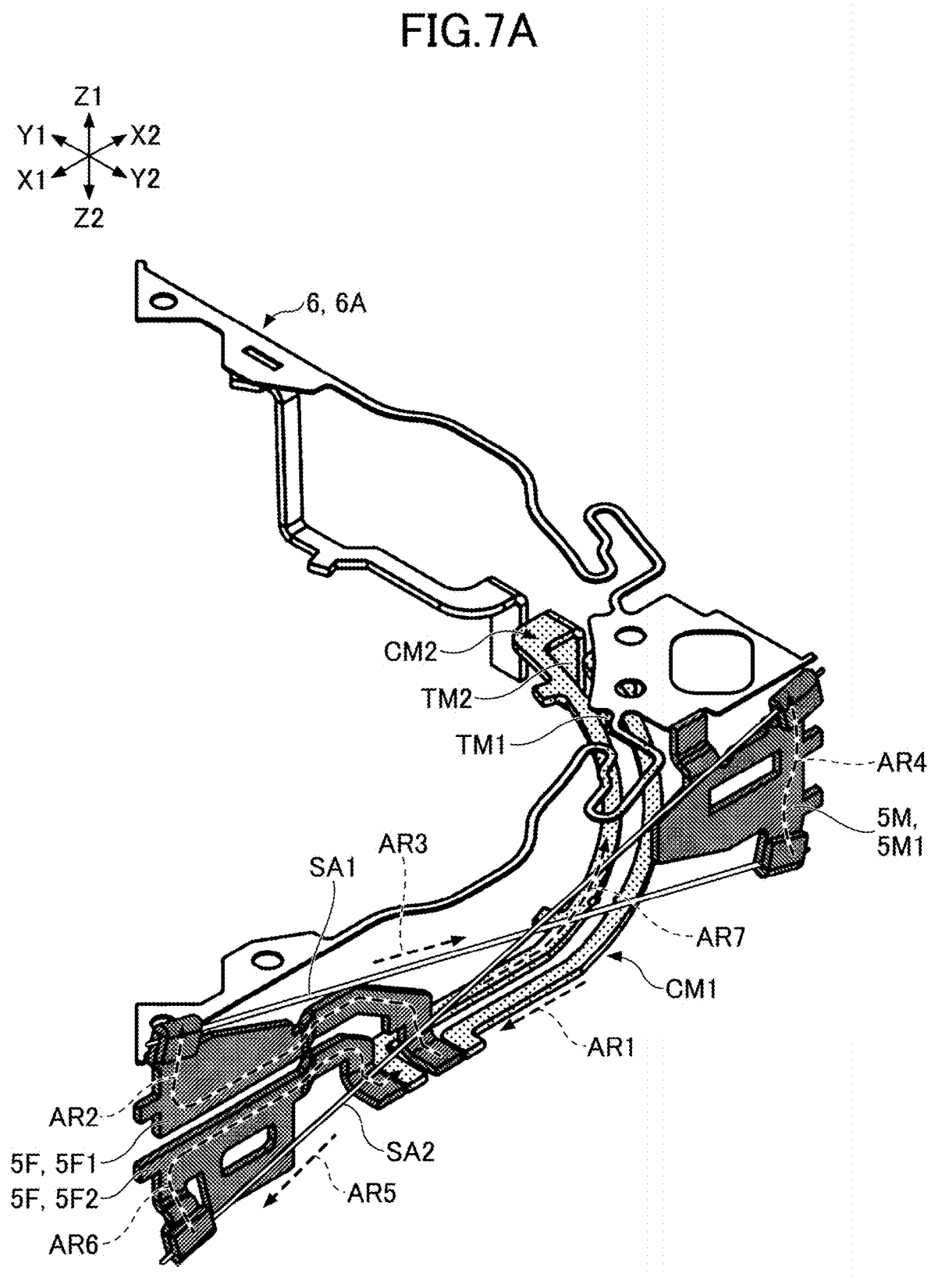
FIG. 7A is a view illustrating an example of paths of a current flowing through the shape memory alloy wires.
Figure 7B:
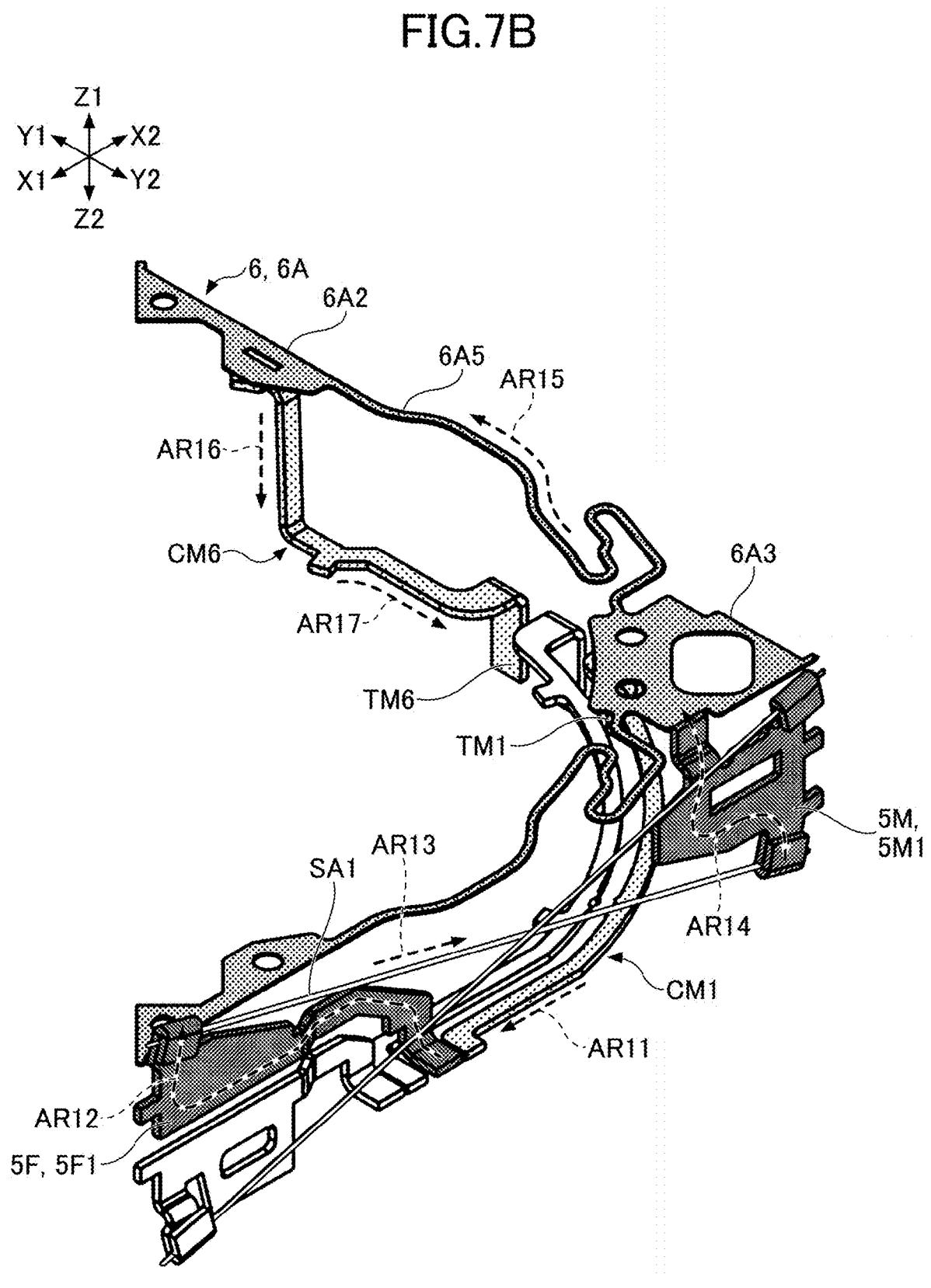
FIG. 7B is a view illustrating another example of the paths of the current flowing through the shape memory alloy wires.
Figure 7C:
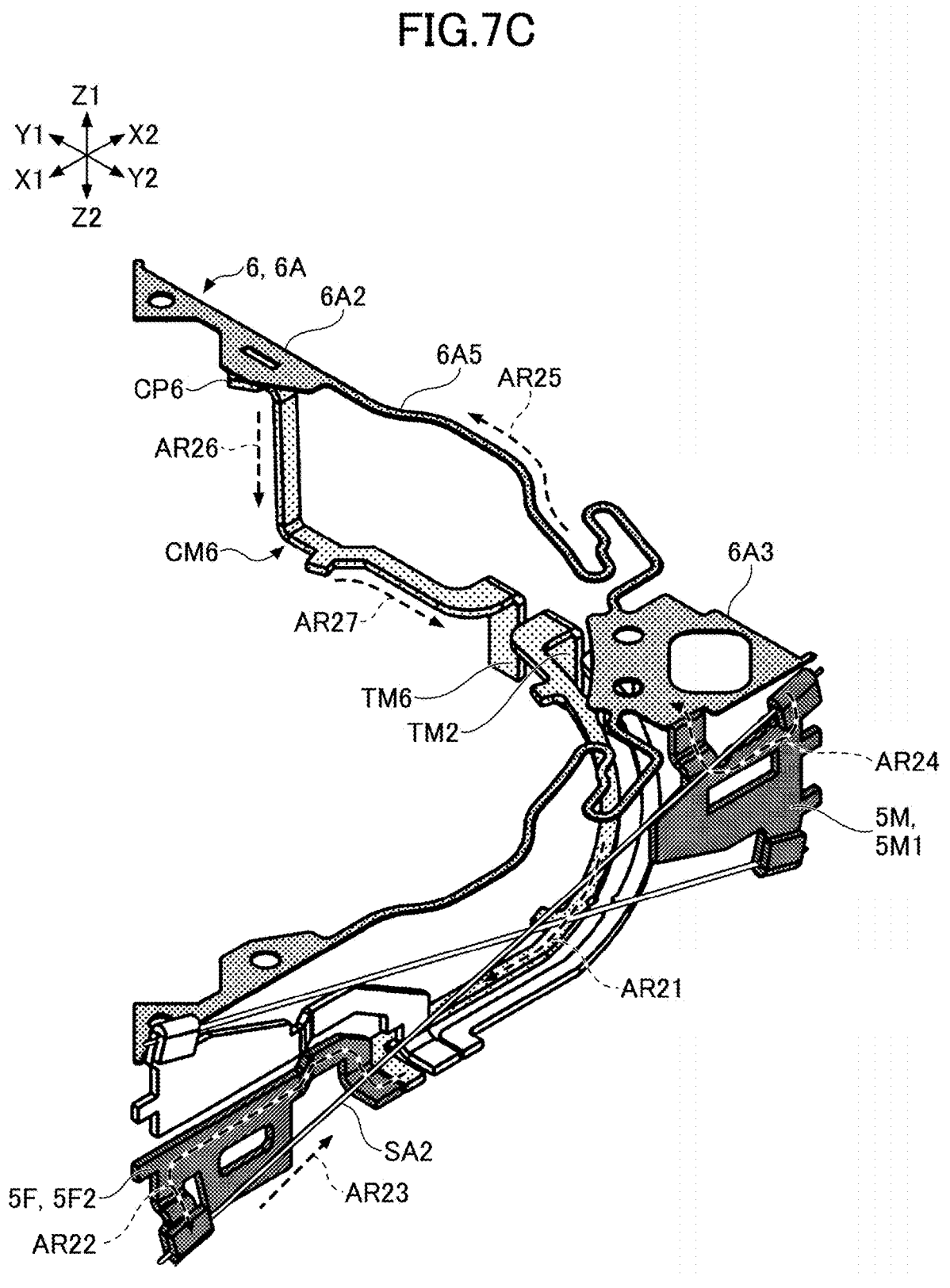
FIG. 7C is a view illustrating still another example of the paths of the current flowing through the shape memory alloy wires.

Specifically, FIG. 7A illustrates the path of the current when the first terminal portion TM1 of the first conductive member CM1 is connected to a high potential and the second terminal portion TM2 of the second conductive member CM2 is connected to a low potential. FIG. 7B illustrates the path of the current when the first terminal portion TM1 of the first conductive member CM1 is connected to a high potential and the sixth terminal portion TM6 of the sixth conductive member CM6 is connected to a low potential. FIG. 7C illustrates the path of the current when the second terminal portion TM2 of the second conductive member CM2 is connected to a high potential and the sixth terminal portion TM6 of the sixth conductive member CM6 is connected to a low potential. The following description to be made with reference to FIGS. 7A to 7C relates to the path of the current flowing through the first wire SAL or the second wire SA2. However, the same applies to the path of the current flowing through the seventh wire SA7 or the eighth wire SA8.

When the first terminal portion TM1 of the first conductive member CM1 is connected to a high potential and the second terminal portion TM2 of the second conductive member CM2 is connected to a low potential, the current flows from the first terminal portion TM1 to the first fixed terminal plate 5F1 through the first conductive member CM1 as indicated by an arrow AR1 in FIG. 7A. Subsequently, the current passes through the first fixed terminal plate 5F1 as indicated by an arrow AR2, through the first wire SA1 as indicated by an arrow AR3, and through the first movable terminal plate 5M1 as indicated by an arrow AR4. Subsequently, the current passes, to the second terminal TM2, through the second wire SA2 as indicated by an arrow AR5, through the second fixed terminal plate 5F2 as indicated by an arrow AR6, and through the second conductive member CM2 as indicated by an arrow AR7.

When the first terminal portion TM1 of the first conductive member CM1 is connected to a high potential and the sixth terminal portion TM6 of the sixth conductive member CM6 is connected to a low potential, the current flows from the first terminal portion TM1 to the first fixed terminal plate 5F1 through the first conductive member CM1 as indicated by an arrow AR11 in FIG. 7B. Subsequently, the current passes through the first fixed terminal plate 5F1 as indicated by an arrow AR12, through the first wire SA1 as indicated by an arrow AR13, and through the first movable terminal plate 5M1 as indicated by an arrow AR14. Subsequently, the current passes through the third portion 6A3, the fifth portion 6A5, and the second portion 6A2 of the first leaf spring 6A as indicated by an arrow AR15, and flows through the sixth conductive member CM6 as indicated by arrows AR16 and AR17, to the sixth terminal TM6.

When the second terminal portion TM2 of the second conductive member CM2 is connected to a high potential and the sixth terminal portion TM6 of the sixth conductive member CM6 is connected to a low potential, the current flows from the second terminal portion TM2 to the second fixed terminal plate 5F2 through the second conductive member CM2 as indicated by an arrow AR21 in FIG. 7C. Subsequently, the current passes through the second fixed terminal plate 5F2 as indicated by an arrow AR22, through the second wire SA2 as indicated by an arrow AR23, and through the first movable terminal plate 5M1 as indicated by an arrow AR24. Subsequently, the current passes through the third portion 6A3, the fifth portion 6A5, and the second portion 6A2 of the first leaf spring 6A as indicated by an arrow AR25, and through the sixth conductive member CM6 to the sixth terminal portion TM6 as indicated by arrows AR26 and AR27.

Figure 7D:
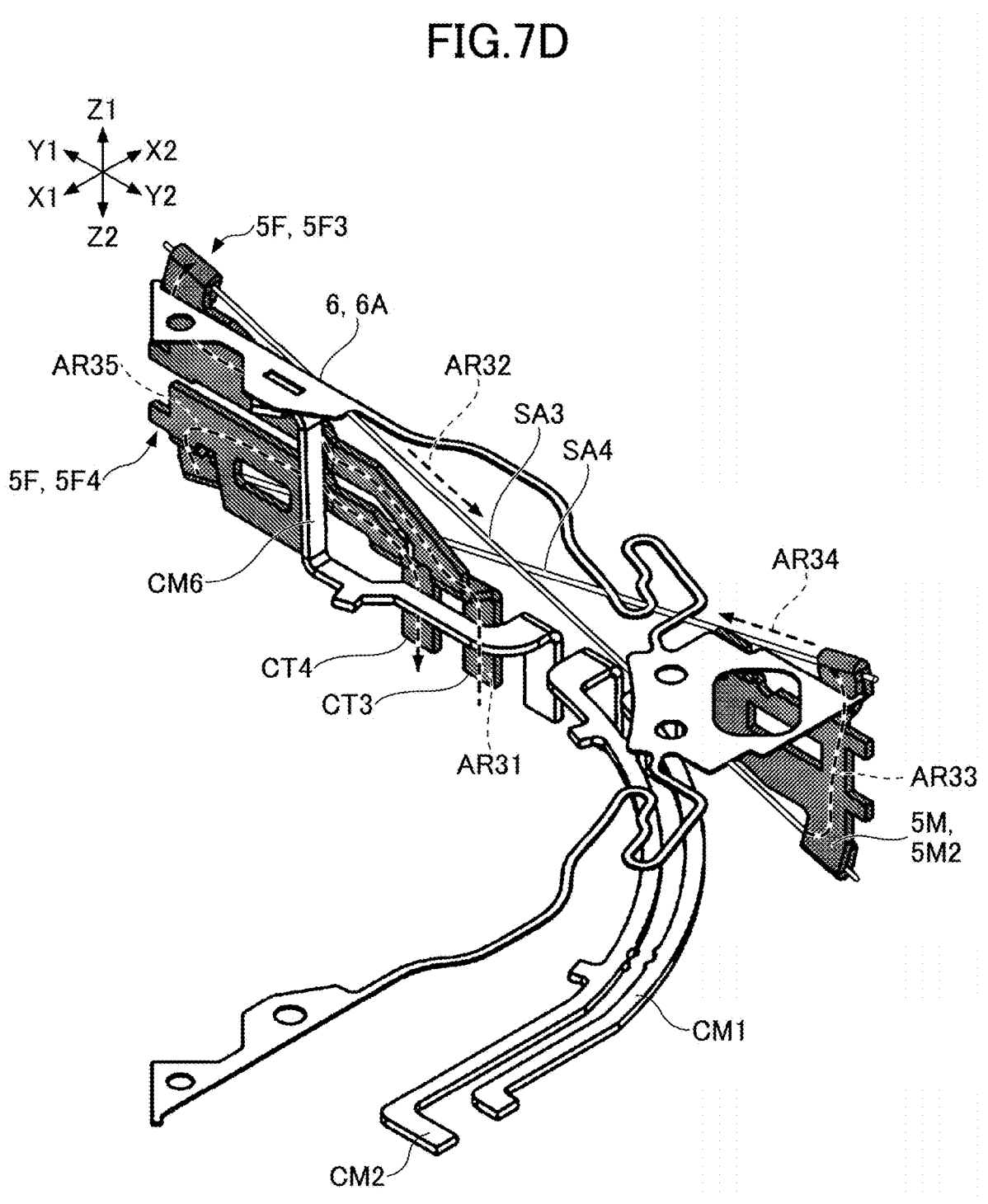
FIG. 7D is a view illustrating still another example of the paths of the current flowing through the shape memory alloy wires.
Figure 7E:
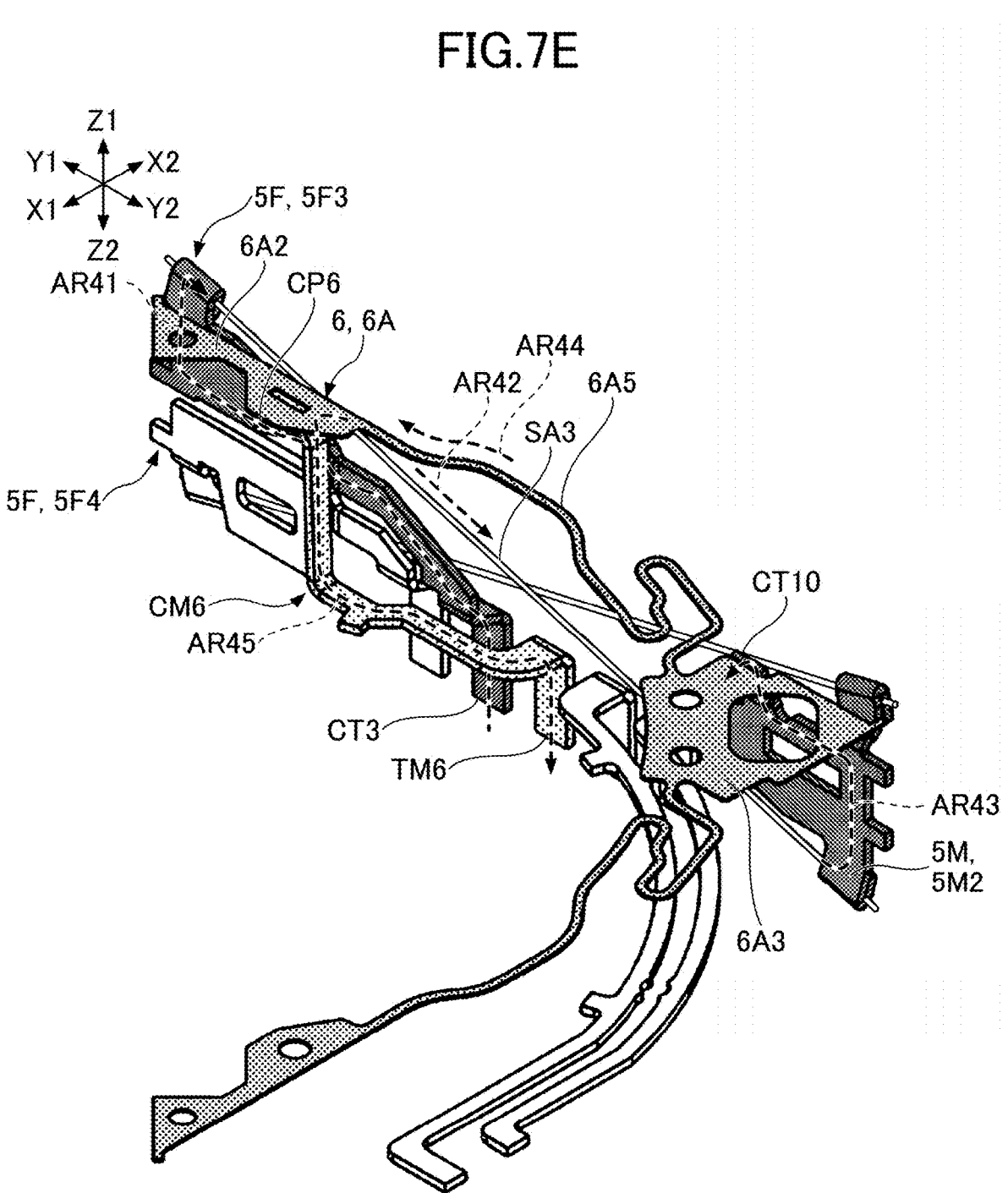
FIG. 7E is a view illustrating still another example of paths of the current flowing through the shape memory alloy wires.
Figure 7F:
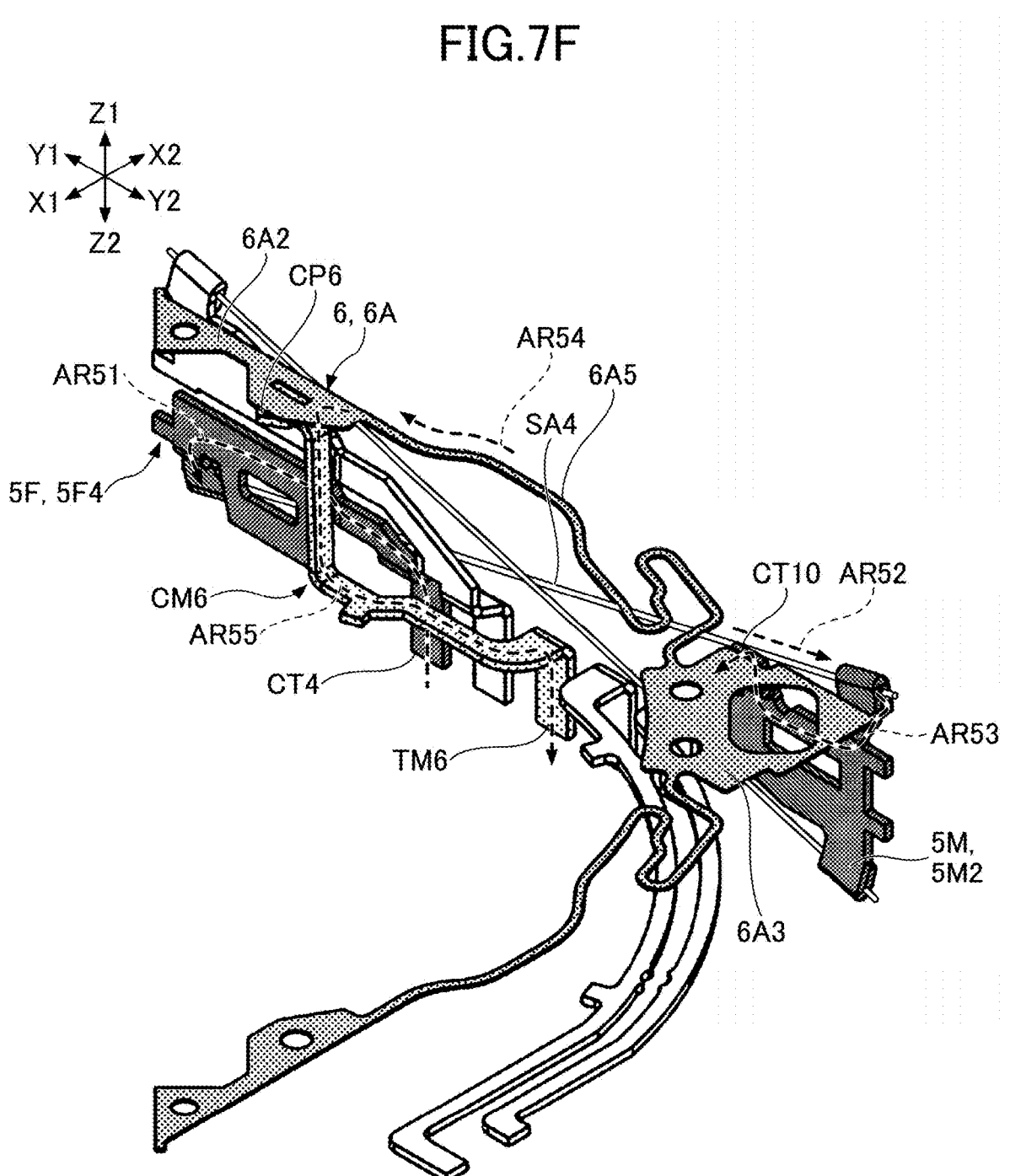
FIG. 7F is a view illustrating still another example of the paths of the current flowing through the shape memory alloy wires.

FIG. 7D illustrates the path of the current when the third contact portion CT3 of the third fixed terminal plate 5F3 is connected to a high potential and the fourth contact portion CT4 of the fourth fixed terminal plate 5F4 is connected to a low potential. FIG. 7E illustrates the path of the current when the third contact portion CT3 of the third fixed terminal plate 5F3 is connected to a high potential and the sixth terminal portion TM6 of the sixth conductive member CM6 is connected to a low potential. FIG. 7F illustrates the path of the current when the fourth contact portion CT4 of the fourth fixed terminal plate 5F4 is connected to a high potential and the sixth terminal portion TM6 of the sixth conductive member CM6 is connected to a low potential. The following description to be made with reference to FIGS. 7D to 7F relates to the path of the current flowing through the third wire SA3 or the fourth wire SA4. However, the same applies to the path of the current flowing through the fifth wire SA5 or the sixth wire SA6.

When the third contact portion CT3 of the third fixed terminal plate 5F3 is connected to a high potential and the fourth contact portion CT4 of the fourth fixed terminal plate 5F4 is connected to a low potential, the current flows from the third contact portion CT3 to the third wire SA3 through the third fixed terminal plate 5F3 as indicated by an arrow AR31 in FIG. 7D. Subsequently, the current passes through the third wire SA3 as indicated by an arrow AR32, through the second movable terminal plate 5M2 as indicated by an arrow AR33, and through the fourth wire SA4 as indicated by an arrow AR34. Subsequently, the current flows through the fourth fixed terminal plate 5F4 to the fourth contact portion CT4 as indicated by an arrow AR35.

When the third contact portion CT3 of the third fixed terminal plate 5F3 is connected to a high potential and the sixth terminal portion TM6 of the sixth conductive member CM6 is connected to a low potential, the current flows from the third contact portion CT3 to the third wire SA3 through the third fixed terminal plate 5F3 as indicated by an arrow AR41 in FIG. 7E. Subsequently, the current passes through the third wire SA3 as indicated by an arrow AR42, through the second movable terminal plate 5M2 as indicated by an arrow AR43, and through the third portion 6A3, the fifth portion 6A5, and the second portion 6A2 of the first leaf spring 6A as indicated by an arrow AR44. Subsequently, the current flows from the sixth joint surface portion CP6 to the sixth terminal portion TM6 through the sixth conductive member CM6 as indicated by an arrow AR45.

When the fourth contact portion CT4 of the fourth fixed terminal plate 5F4 is connected to a high potential and the sixth terminal portion TM6 of the sixth conductive member CM6 is connected to a low potential, the current flows from the fourth contact portion CT4 to the fourth wire SA4 through the fourth fixed terminal plate 5F4 as indicated by an arrow AR51 in FIG. 7F. Subsequently, the current passes through the fourth wire SA4 as indicated by an arrow AR52, through the second movable terminal plate 5M2 as indicated by an arrow AR53, and through the third portion 6A3, the fifth portion 6A5, and the second portion 6A2 of the first leaf spring 6A as indicated by an arrow AR54. Subsequently, the current flows from the sixth joint surface portion CP6 to the sixth terminal portion TM6 through the sixth conductive member CM6 as indicated by an arrow AR55.

Figure 8A:
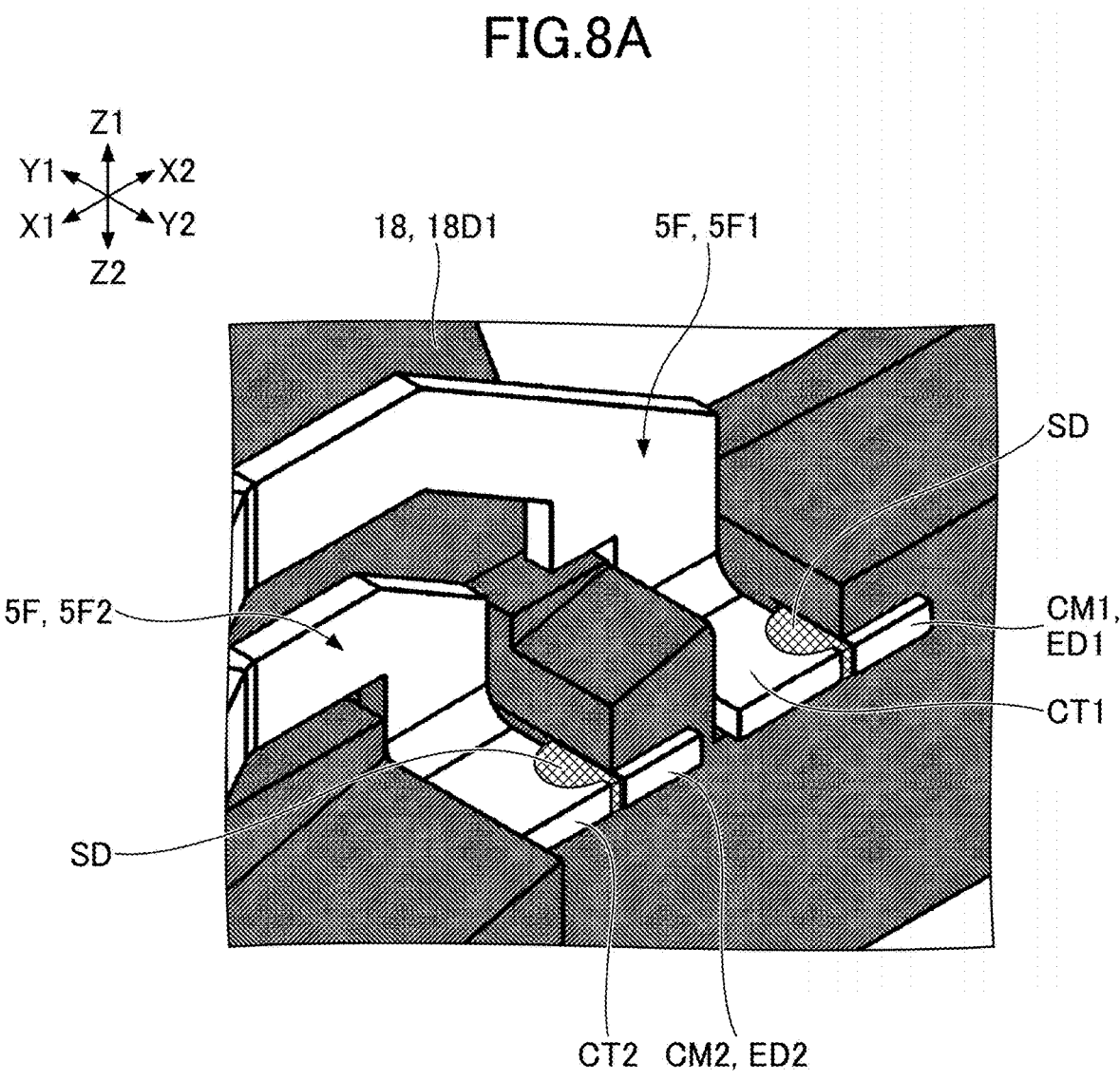
FIG. 8A is a view illustrating an example of a connection structure connecting the fixed metal member and the conductive member.
Figure 8B:
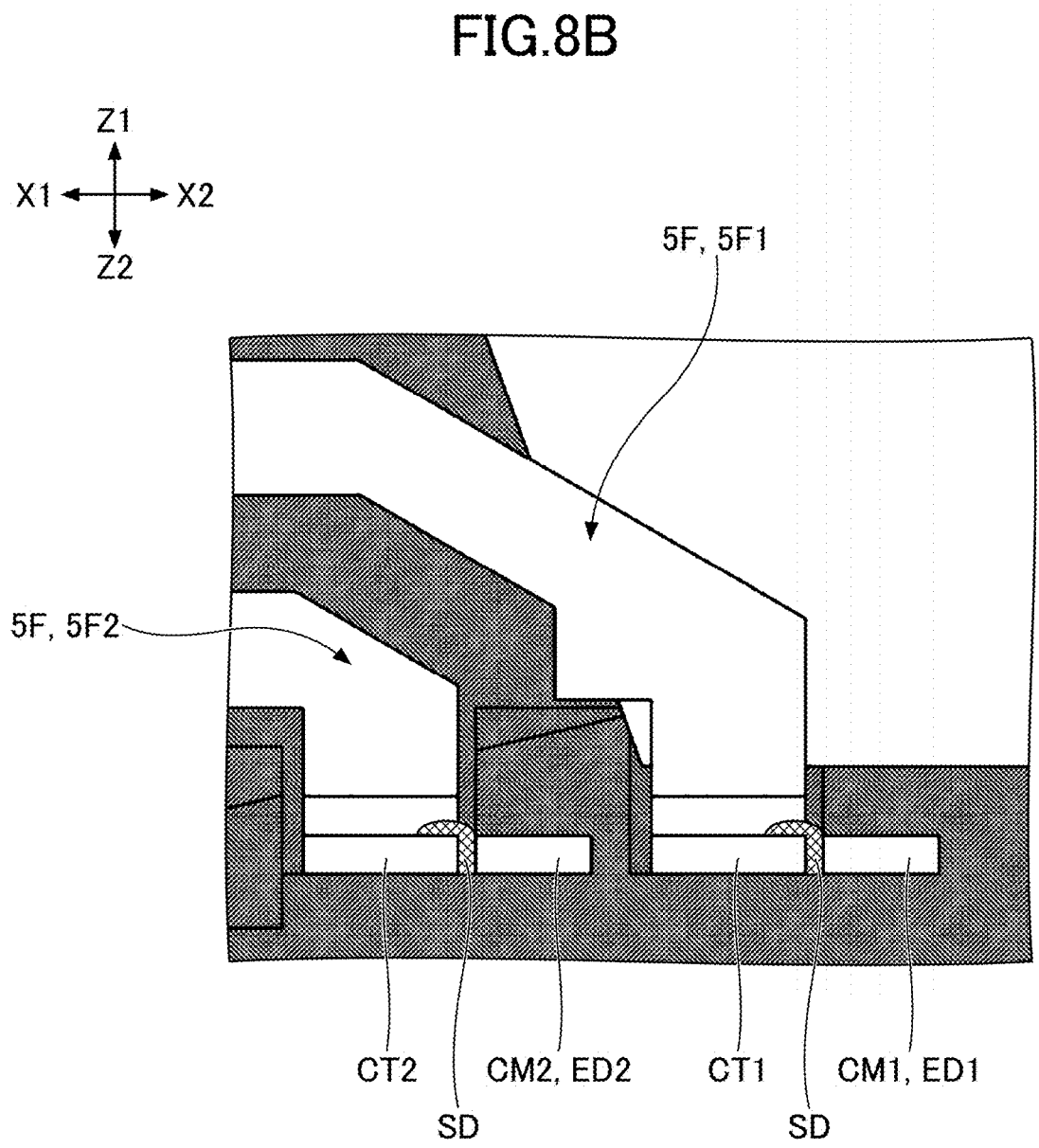
FIG. 8B is a view illustrating an example of the connection structure connecting the fixed metal member and the conductive member.

Next, an example of a connection structure connecting the fixed metal member 5F and the conductive member CM will be described with reference to FIGS. 8A and 8B. FIGS. 8A and 8B are views illustrating an example of a connection structure connecting the fixed metal member 5F and the conductive member CM. Specifically, FIG. 8A is an enlarged view (perspective view) of a range R1 enclosed by a dashed line as illustrated in FIG. 3B. FIG. 8B is a right-hand side view of the range R1 enclosed by the dashed line as illustrated in FIG. 3B. In FIGS. 8A and 8B, for clarification, the base member 18 is shown with a fine dot pattern.

As illustrated in FIGS. 8A and 8B, the first fixed terminal plate 5F1 is attached with a photocurable adhesive to the side wall of the first fixed base 18D1 of the base member 18 on the Y2 side (right attachment surface). The first contact portion CT1 of the first fixed terminal plate 5F1 is bonded with the bonding material SD to the first connection portion ED1 of the first conductive member CM1. In FIGS. 8A and 8B, for clarification, the bonding material SD is shown with a cross pattern.

Similarly, the second fixed terminal plate 5F2 is attached with a photocurable adhesive to the side wall of the first fixed base 18D1 of the base member 18 on the Y2 side (right attachment surface). The second contact portion CT2 of the second fixed terminal plate 5F2 is bonded with the bonding material SD to the second connection portion ED2 of the second conductive member CM2.

As illustrated in FIG. 8B, the first connection portion ED1 is disposed such that an end surface thereof on the X1 side (front side) faces, in an X-axis direction, an end surface of the first contact portion CT1 on the X2 side (rear side). Similarly, the second connection portion ED2 is disposed such that an end surface thereof on the X1 side (front side) faces, in the X-axis direction, an end surface of the second contact portion CT2 on the X2 side (rear side).

This arrangement enables the bonding material SD to attach to at least the front surface (X1-side surface) of the first connection portion ED1, and the rear surface (X2-side surface) and the upper surface (Z1-side surface) of the first contact portion CT1, and thus the bonding material SD can increase connection strength between the first contact portion CT1 and the first connection portion ED1. The same applies to connection strength caused by the bonding material SD between the second contact portion CT2 and the second connection portion ED2.

Also, this arrangement can prevent the bonding material SD from bonding the first contact portion CT1 to only a right-hand end surface (Y2-side surface) of the first connection portion ED1 that is not subjected to plating. The same applies to bonding between the second connection portion ED2 and the second contact portion CT2. Also, the right-hand end surface (Y2-side surface) of the first connection portion ED1 is a cut surface formed by separating an unillustrated connection portion to be cut, and is not subjected to plating. The to-be-cut connection portion is a portion connecting multiple conductive members, and is used when the conductive members are embedded in the base member 18 through insert molding. However, the to-be-cut connection portion is cut and discarded eventually.

Figure 9:
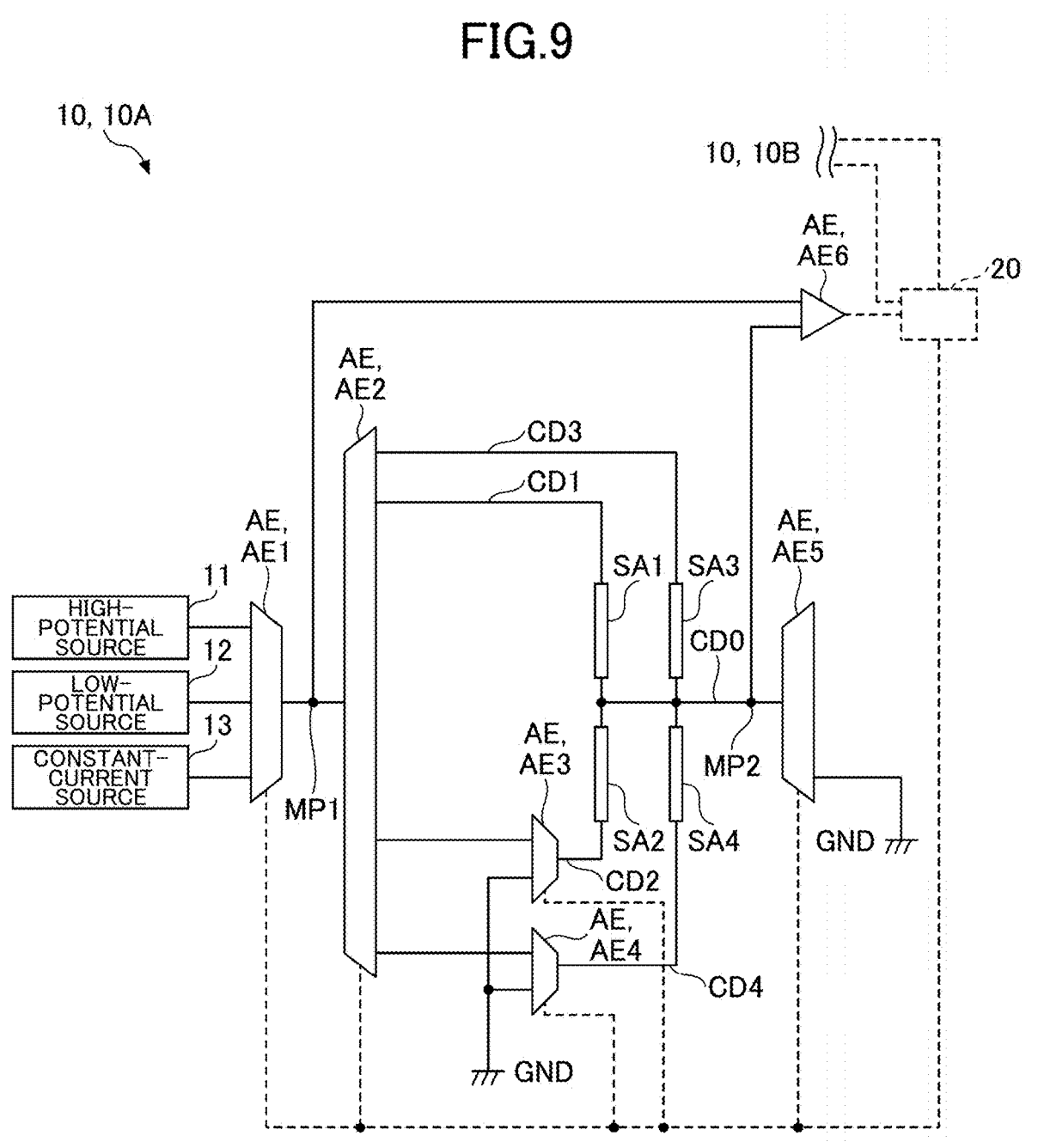

Next, a driver 10 and a controller 20, components of the imaging apparatus 101 as described above, will be described with reference to FIG. 9. FIG. 9 is a diagram illustrating a configuration example of the driver 10 and the controller 20. In FIG. 9, for clarification, a portion forming the driver 10 is shown with a solid line, and a portion forming the controller 20 is shown with a dashed line.

The driver 10 is configured to supply a driving current to the shape memory alloy wires SA and drive the shape memory alloy wires SA. The driving current is a current for driving (heating and shrinking) the shape memory alloy wires SA, e.g., a pulse current. In the present embodiment, the driver 10 is an electronic circuit formed of an active element AE, such as a switching element, an operational amplifier, an IC, or the like, and is configured to operate in accordance with a control signal from the controller 20.

In the illustrated example, the driver 10 includes: a first driver 10A configured to drive the first wire SA1 to the fourth wire SA4; and a second driver 10B (details thereof are not described) configured to drive the fifth wire SA5 to the eighth wire SA8. The second driver 10B has the same configuration as that of the first driver 10A.

The controller 20 is configured to control the driver 10. In the present embodiment, the controller 20 is a microcomputer including a central processing unit (CPU), a volatile storage, a nonvolatile storage, and the like.

In the illustrated example, the controller 20 can control the driver 10 so as to move the lens holder 2 along the direction parallel to the optical axis OA at the Z1 side (subject side) of the imaging element by utilizing a driving force generated along the direction parallel to the optical axis OA through shrinkage of the shape memory alloy wire SA. By moving the lens holder 2 in this manner, the controller 20 can achieve an autofocus function, one of the lens adjustment functions. Specifically, the controller 20 can achieve macro photography by moving the lens holder 2 in a direction away from the imaging element, and can achieve infinity focus by moving the lens holder 2 in a direction approaching the imaging element.

Further, the controller 20 can control the driver 10 so as to move the lens holder 2 in a direction crossing the optical axis OA by controlling the current flowing through the shape memory alloy wires SA. Thereby, the controller 20 can achieve an image stabilizing function.

In the illustrated example, the imaging apparatus 101 having an approximately rectangular parallelepiped shape is attached on an unillustrated external substrate in which an unillustrated imaging element is mounted. A camera module includes the external substrate, the imaging apparatus 101, the lens body mounted in the lens holder 2, and the imaging element disposed to face the lens body. The driver 10 and the controller 20 are mounted in the external substrate. However, the driver 10, the controller 20, or both may be disposed in the interior of the imaging apparatus 101. The imaging element may be mounted in the imaging apparatus 101.

Also, in the illustrated example, the controller 20 can control the driver 10 such that a measurement current is supplied to each of the eight shape memory alloy wires SA at a timing different from the timing at which the driving current is supplied.

The measurement current is a current for measuring resistance between both ends of the shape memory alloy wire SA. The measurement current is preferably a weak current that does not influence the length of the shape memory alloy wire SA, e.g., a pulse current. In the illustrated example, the controller 20 can derive the magnitude of the resistance between both of the ends of the shape memory alloy wire SA (measured resistance value) by measuring a voltage between both of the ends of the shape memory alloy wire SA when a measurement current having a known magnitude is allowed to flow through the shape memory alloy wire SA. The measured resistance value of each of the eight shape memory alloy wires SA is used to achieve a desired posture of the lens holder 2 (lens body). For example, the controller 20 can set the target lengths of the eight shape memory alloy wires SA corresponding to the desired posture of the lens holder 2 (lens body), and further can set the target resistance values of the eight shape memory alloy wires SA corresponding to the eight target lengths. Then, the controller 20 can achieve the desired posture of the lens holder 2 (lens body) by controlling the driver 10 such that the difference between the measured resistance value and the target resistance value of each of the eight shape memory alloy wires SA becomes closer to zero. The measurement current is a weak current that does not influence the length of the shape memory alloy wire SA, and thus the magnitude of the measurement current is much lower than that of the driving current.

In the illustrated example, the controller 20 sets the target resistance value for each of the eight shape memory alloy wires SA in order to achieve the desired posture of the lens holder 2 (lens body). The controller 20 controls the driver 10 such that the measured resistance value of each of the eight shape memory alloy wires SA becomes the same as the target resistance value. That is, the controller 20 performs feedback control of the resistance value of each of the eight shape memory alloy wires SA.

Specifically, the controller 20 controls the driver 10 such that the difference between the target resistance value and the measured resistance value becomes closer to zero with respect to each of the eight shape memory alloy wires SA, thereby adjusting the magnitude, the supply time (duration), or both of the driving current supplied to each of the eight shape memory alloy wires SA. In the illustrated example, when the target resistance value of a specific one of the shape memory alloy wires SA is lower than the measured resistance value, the controller 20 increases the quantity of power supplied to the specific shape memory alloy wire SA in order to shrink the specific shape memory alloy wire SA. For example, the controller 20 increases the supply time of the driving current, i.e., the time a predetermined voltage is applied between both of the ends of the specific shape memory alloy wire SA. Conversely, when the target resistance value of the specific shape memory alloy wire SA is higher than the measured resistance value, the controller 20 reduces the quantity of power supplied to the specific shape memory alloy wire SA and increases the quantity of power supplied to the shape memory alloy wires SA other than the specific shape memory alloy wire SA, in order to elongate the specific shape memory alloy wire SA. For example, the controller 20 increases the time the predetermined voltage is applied between both of the ends of each of the shape memory alloy wires SA other than the specific shape memory alloy wire SA.

Specifically, the first driver 10A includes a high-potential source 11, a low-potential source 12, a constant-current source 13, and an active element AE, as illustrated in FIG. 9. The following description to be made with reference to FIG. 9 relates to the first driver 10A. However, the same applies to the second driver 10B.

The high-potential source 11 is a potential source configured to have a potential higher than those of the ground (GND) and the low-potential source 12.

The low-potential source 12 is a potential source configured to have a potential higher than that of the ground (GND) and lower than that of the high-potential source 11.

Although both of the high-potential source 11 and the low-potential source 12 have fixed potentials, the high-potential source 11, the low-potential source 12, or both may be configured to dynamically change in the potential in accordance with a control signal from the controller 20.

The constant-current source 13 is an electrical circuit configured to flow a current having a constant magnitude even if the resistance value of a load is changed. In the illustrated example, the constant-current source 13 is configured to flow a measurement current having a constant magnitude to each of the first wire SA1 to the fourth wire SA4. The magnitude of the measurement current is set, for example, by the controller 20. In this case, the magnitude of the measurement current may be stored in a nonvolatile storage in the controller 20. For example, the magnitude of the measurement current may be set in accordance with, for example, the results of inspection performed in factories at the time of shipment of products (imaging apparatus 101) so as to conform to each of the first wire SA1 to the fourth wire SA4. In this case, variation in characteristics due to difference between the individual shape memory alloy wires is reduced.

The active element AE is an element configured to perform active operations, such as amplification, rectification, or the like with the supplied power. In the illustrated example, the active element AE includes a first active element AE1 to a sixth active element AE6.

The first active element AE1 is a multiplexer configured to integrate three inputs into one output. In the illustrated example, the three inputs of the first active element AE1 are connected to the high-potential source 11, the low-potential source 12, and the constant-current source 13, and one output of the first active element AE1 is connected to a second active element AE2.

The second active element AE2 is a demultiplexer configured to distribute one input into four outputs. In the illustrated example, one input of the second active element AE2 is connected to the first active element AE1, and the four outputs of the second active element AE2 are connected to the first wire SA1, the third wire SA3, the third active element AE3, and the fourth active element AE4.

The third active element AE3 is a multiplexer configured to integrate two inputs into one output. In the illustrated example, two inputs of the third active element AE3 are connected to the second active element AE2 and the ground (GND) and one output of the third active element AE3 is connected to the second wire SA2.

The fourth active element AE4 is a multiplexer configured to integrate two inputs into one output. In the illustrated example, two inputs of the fourth active element AE4 are connected to the second active element AE2 and the ground (GND) and one output of the fourth active element AE4 is connected to the fourth wire SA4.

The fifth active element AE5 is a switching element configured to control connection between the input and the output. In the illustrated example, the input of the fifth active element AE5 is connected to a common conductive path CD0, a conductive path connected to the first wire SA1, the second wire SA2, the third wire SA3, and the fourth wire SA4, and one output of the fifth active element AE5 is connected to the ground (GND).

The sixth active element AE6 is an operational amplifier having two inputs and one output. In the illustrated example, one of the inputs of the sixth active element AE6 is connected to a first measurement point MP1 on the conductive path between the first active element AE1 and the second active element AE2 and the other input of the sixth active element AE6 is connected to a second measurement point MP2 on the common conductive path CD0, and one output of the sixth active element AE6 is connected to the controller 20.

In the illustrated example, one end of the first wire SA1 is connected to the second active element AE2 through a first conductive path CD1, and the other end of the first wire SA1 is connected to the common conductive path CD0. Also, one end of the second wire SA2 is connected to the third active element AE3 through a second conductive path CD2, and the other end of the second wire SA2 is connected to the common conductive path CD0. Also, one end of the third wire SA3 is connected to the second active element AE2 through a third conductive path CD3, and the other end of the third wire SA3 is connected to the common conductive path CD0. Also, one end of the fourth wire SA4 is connected to the fourth active element AE4 through a fourth conductive path CD4, and the other end of the fourth wire SA4 is connected to the common conductive path CD0.

Specifically, as illustrated in FIG. 7A, the first conductive path CD1 includes the first fixed terminal plate 5F1, and the second conductive path CD2 includes the second fixed terminal plate 5F2. Further, as illustrated in FIG. 7D, the third conductive path CD3 includes the third fixed terminal plate 5F3, and the fourth conductive path CD4 includes the fourth fixed terminal plate 5F4. As illustrated in FIGS. 7B, 7C, 7E, and 7F, the common conductive path CD0 includes the first movable terminal plate 5M1, the second movable terminal plate 5M2, the first leaf spring 6A (the third portion 6A3, the fifth portion 6A5, and the second portion 6A2), and the sixth conductive member CM6.

That is, as illustrated in FIGS. 7A to 7F, the first driver 10A can control the shrinkage of each of the first wire SA1 to the fourth wire SA4 by controlling the voltage applied to the first terminal portion TM1, the second terminal portion TM2, the sixth terminal portion TM6, the third contact portion CT3, and the fourth contact portion CT4. The same applies to the second driver 10B.

Also, in the illustrated example, when flowing the current to the third wire SA3 and the fourth wire SA4, the first driver 10A does not use long conductive paths that are used when flowing the current to the first wire SA1 and the second wire SA2 (the first and second conductive members CM1 and CM2 extending along the opening 18K of the base member 18). Therefore, this configuration provides the effect of reducing a magnetic field (induced magnetic field) formed around the conductive path, which can adversely influence the quality of an image formed by the imaging element when flowing the current to the third wire SA3 and the fourth wire SA4. In other words, this configuration provides the effect of being able to reduce the limitation on the magnitude of the current flowing through the third wire SA3 and the fourth wire SA4, compared to the limitation on the magnitude of the current flowing through the first wire SA1 and the second wire SA2.

Also, in the illustrated example, the first driver 10A and the second driver 10B are configured to share in use the high-potential source 11, the low-potential source 12, and the constant-current source 13. However, the high-potential source 11, the low-potential source 12, the constant-current source 13, or any combination thereof may be provided individually for the first driver 10A and the second driver 10B. For example, the constant-current source 13 may include a first constant-current source connected to the first active element AE1 of the first driver 10A, and a second constant-current source connected to an unillustrated first active element of the second driver 10B.

In the illustrated example, the driver 10 is connected to the high-potential source 11 and the low-potential source 12. However, the driver 10 may be connected to one of the high-potential source 11 or the low-potential source 12. In this case, the other of the high-potential source 11 or the low-potential source 12 may be omitted.

In the illustrated example, the driver 10 includes the constant-current source 13, and is configured to electrically connect the constant-current source 13 and the shape memory alloy wire SA when flowing the measurement current through the shape memory alloy wire SA. However, the constant-current source 13 may be omitted. In this case, the driver 10 may include an analog-to-digital (AD) converter configured to detect the magnitude of the measurement current flowing through the shape memory alloy wire SA, as a voltage value. Alternatively, the driver 10 may include a shunt resistor configured to measure the magnitude of the measurement current flowing through the shape memory alloy wire SA.

In the illustrated example, the common conductive path CD0 is connected to the ground (GND) via the fifth active element AE5. However, the common conductive path CD0 may be connected, via an active element, to the high-potential source 11 or the low-potential source 12. In this case, each of the first wire SA1 to the fourth wire SA4 may be configured such that one end thereof is connected to the ground (GND) via an active element, such as an N-channel transistor or the like, and the other end thereof is connected to the common conductive path CD0.

Next, an example of the path of the current flowing through the shape memory alloy wire SA will be described with reference to FIGS. 10A to 10D. FIGS. 10A to 10D are views illustrating an example of the path of the current in the driver 10, and correspond to FIG. 9. In FIGS. 10A to 10D, for clarification, a conductive path through which the current is flowing is shown with a thick solid line, and a conductive path through which no current is flowing is shown with a dashed line.

Figure 10A:
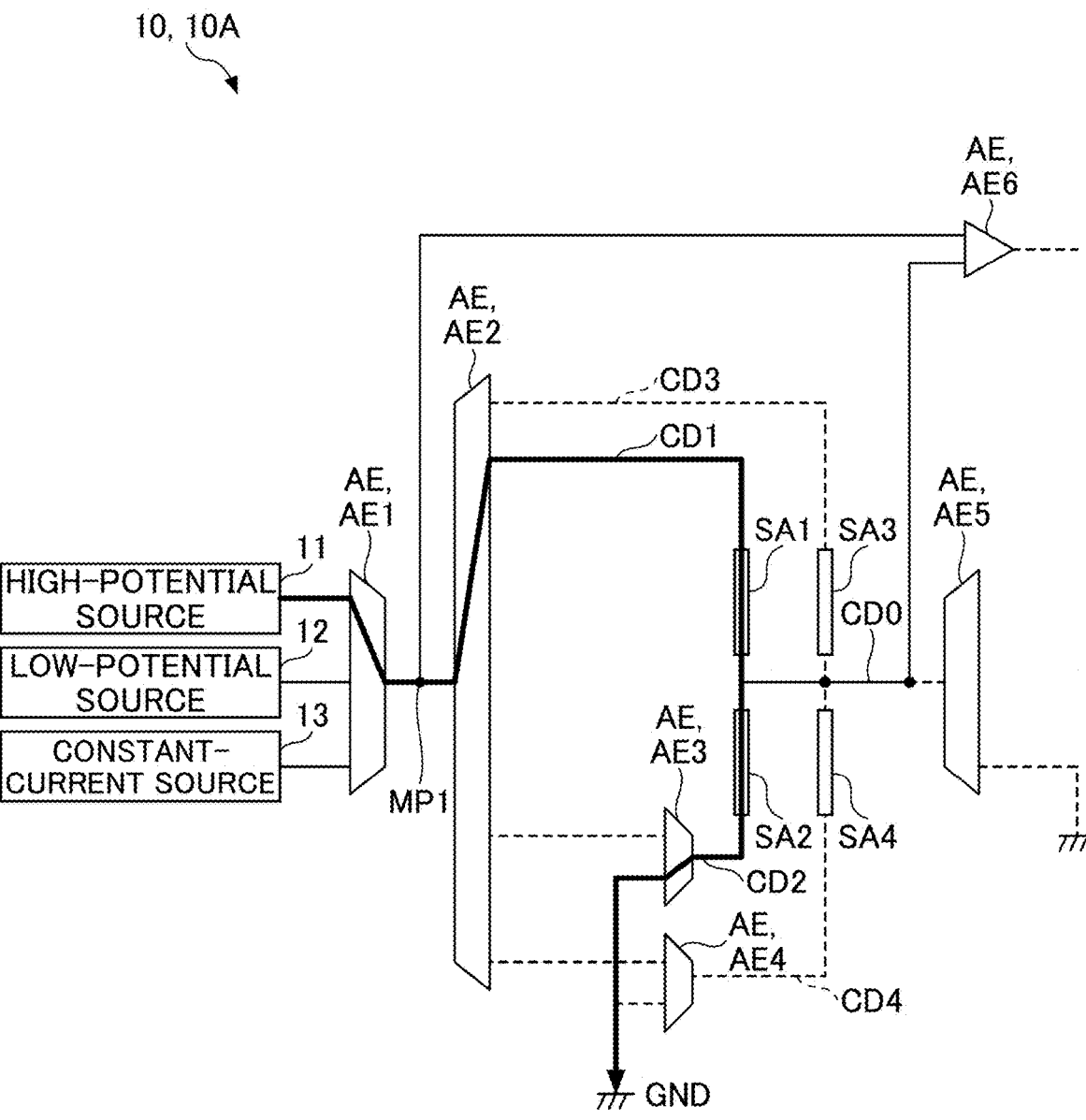
FIG. 10A is a diagram illustrating an example of the path of the current in the driver.

FIG. 10A illustrates an example of the path of the driving current flowing through two shape memory alloy wires SA (first wire SA1 and second wire SA2) that are electrically connected in series. The path of the driving current as illustrated in FIG. 7A is a specific example of the path of the driving current as illustrated in FIG. 10A. Specifically, FIG. 10A illustrates the path of the driving current flowing from the high-potential source 11 to the ground (GND) when the high-potential source 11, the first conductive path CD1, the first wire SA1, the common conductive path CD0, the second wire SA2, the second conductive path CD2, and the ground (GND) are electrically connected in series. In this case, the first conductive path CD1 is achieved by the first conductive member CM1 and the first fixed terminal plate 5F1 in FIG. 7A, the second conductive path CD2 is achieved by the second fixed terminal plate 5F2 and the second conductive member CM2 in FIG. 7A, and the common conductive path CD0 is achieved by the first movable terminal plate 5M1.

Figure 10B:
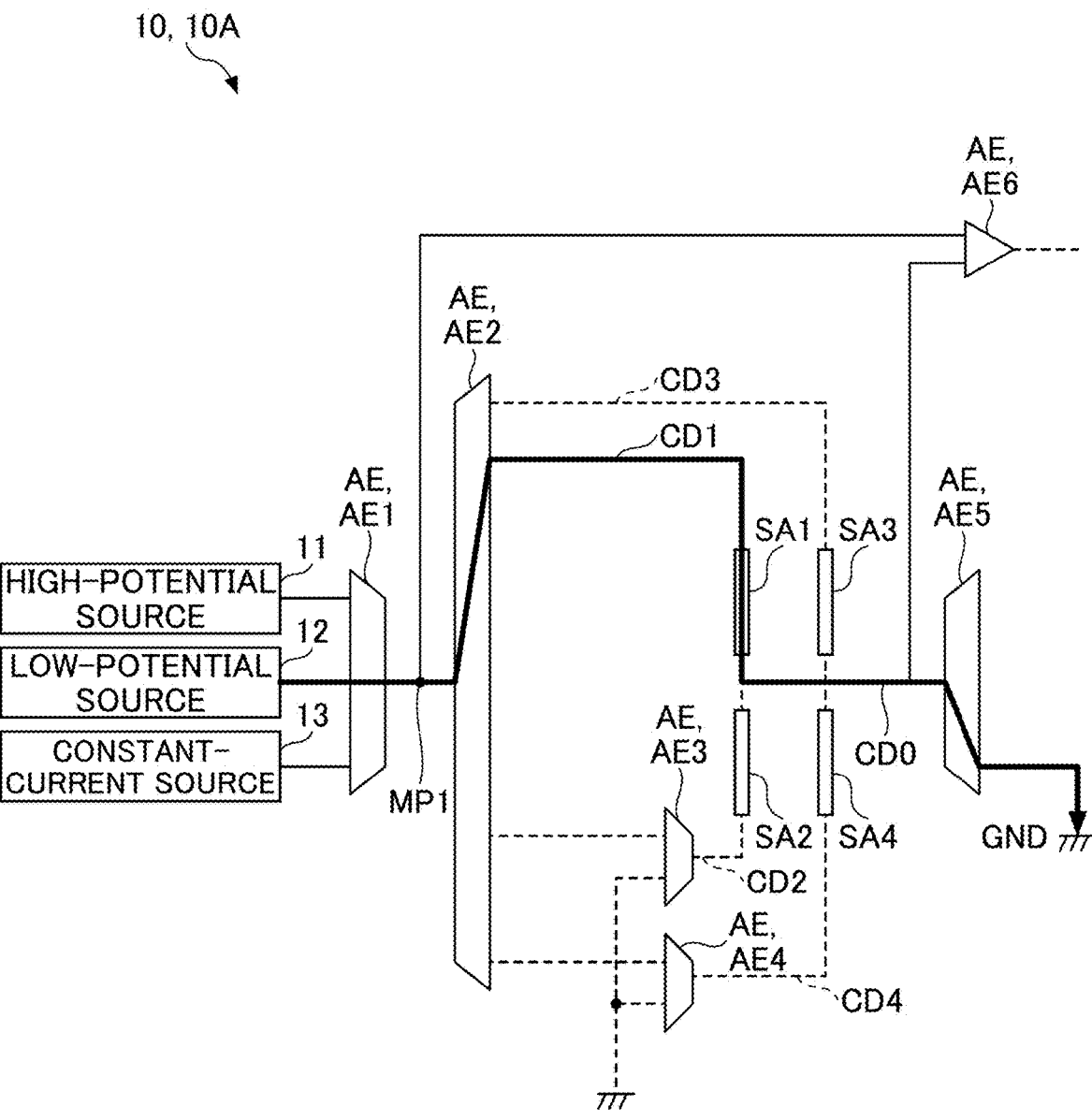
FIG. 10B is a diagram illustrating another example of the path of the current in the driver.

FIG. 10B illustrates an example of the path of the driving current flowing through one shape memory alloy wire SA (first wire SA1). The path of the driving current as illustrated in FIG. 7B is a specific example of the path of the driving current as illustrated in FIG. 10B. Specifically, FIG. 10B illustrates the path of the driving current flowing from the low-potential source 12 to the ground (GND) when the low-potential source 12, the first conductive path CD1, the first wire SA1, the common conductive path CD0, and the ground (GND) are electrically connected in series. In this case, the first conductive path CD1 is achieved by the first conductive member CM1 and the first fixed terminal plate 5F1 in FIG. 7B, and the common conductive path CD0 is achieved by the first movable terminal plate 5M1, the first plate spring 6A (the third portion 6A3, the fifth portion 6A5, and the second portion 6A2), and the sixth conductive member CM6 in FIG. 7B.

Figure 10C:
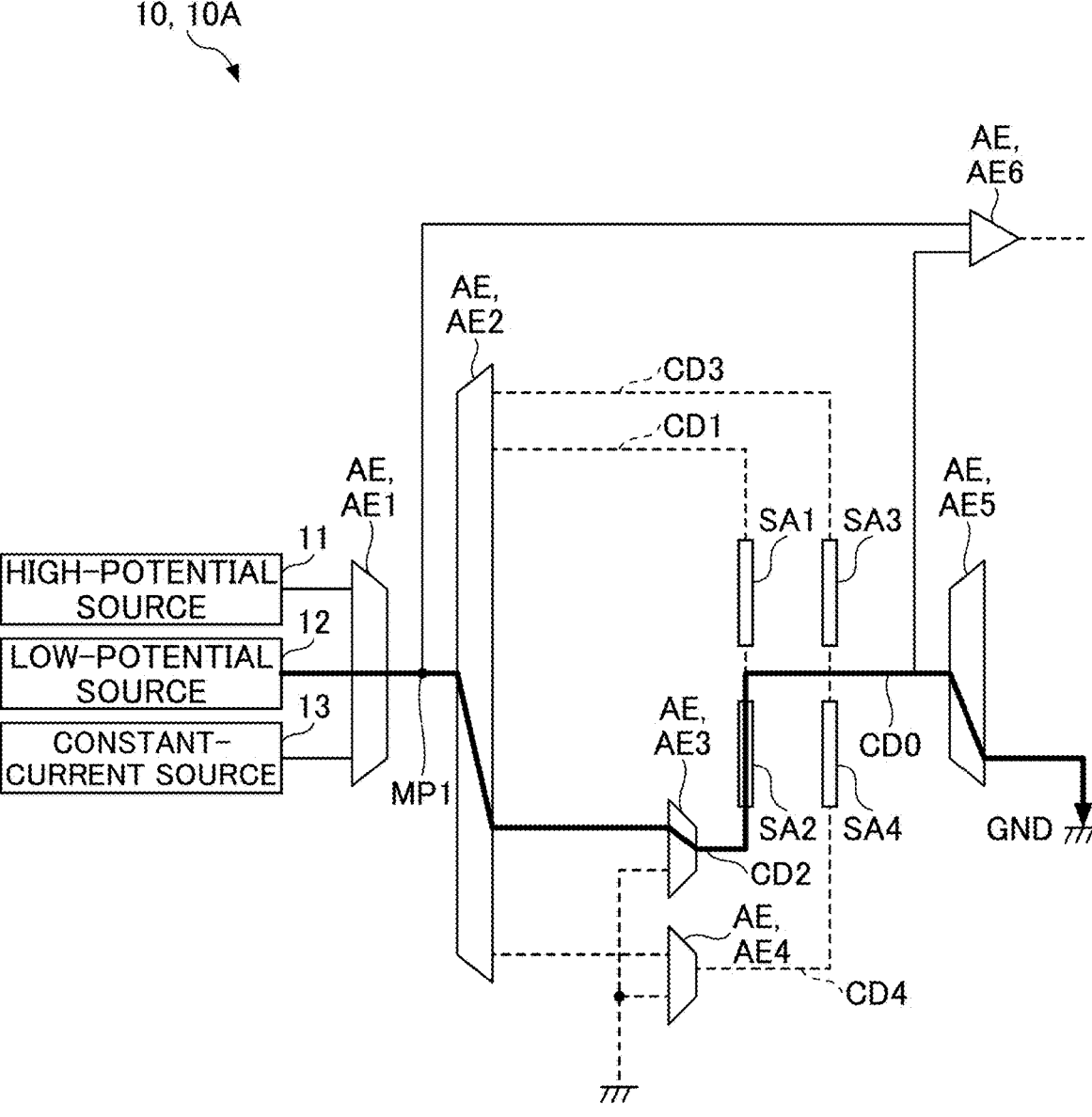
FIG. 10C is a diagram illustrating still another example of the path of the current in the driver.

FIG. 10C illustrates another example of the path of the driving current flowing through one shape memory alloy wire SA (second wire SA2). The path of the driving current as illustrated in FIG. 7C is a specific example of the path of the driving current as illustrated in FIG. 10C. Specifically, FIG. 10C illustrates the path of the driving current flowing from the low-potential source 12 to the ground (GND) when the low-potential source 12, the second conductive path CD2, the second wire SA2, the common conductive path CD0, and the ground (GND) are electrically connected in series. In this case, the second conductive path CD2 is achieved by the second conductive member CM2 and the second fixed terminal plate 5F2 in FIG. 7C, and the common conductive path CD0 is achieved by the first movable terminal plate 5M1, the first leaf spring 6A (the third portion 6A3, the fifth portion 6A5, and the second portion 6A2), and the sixth conductive member CM6 in FIG. 7C.

Figure 10D:
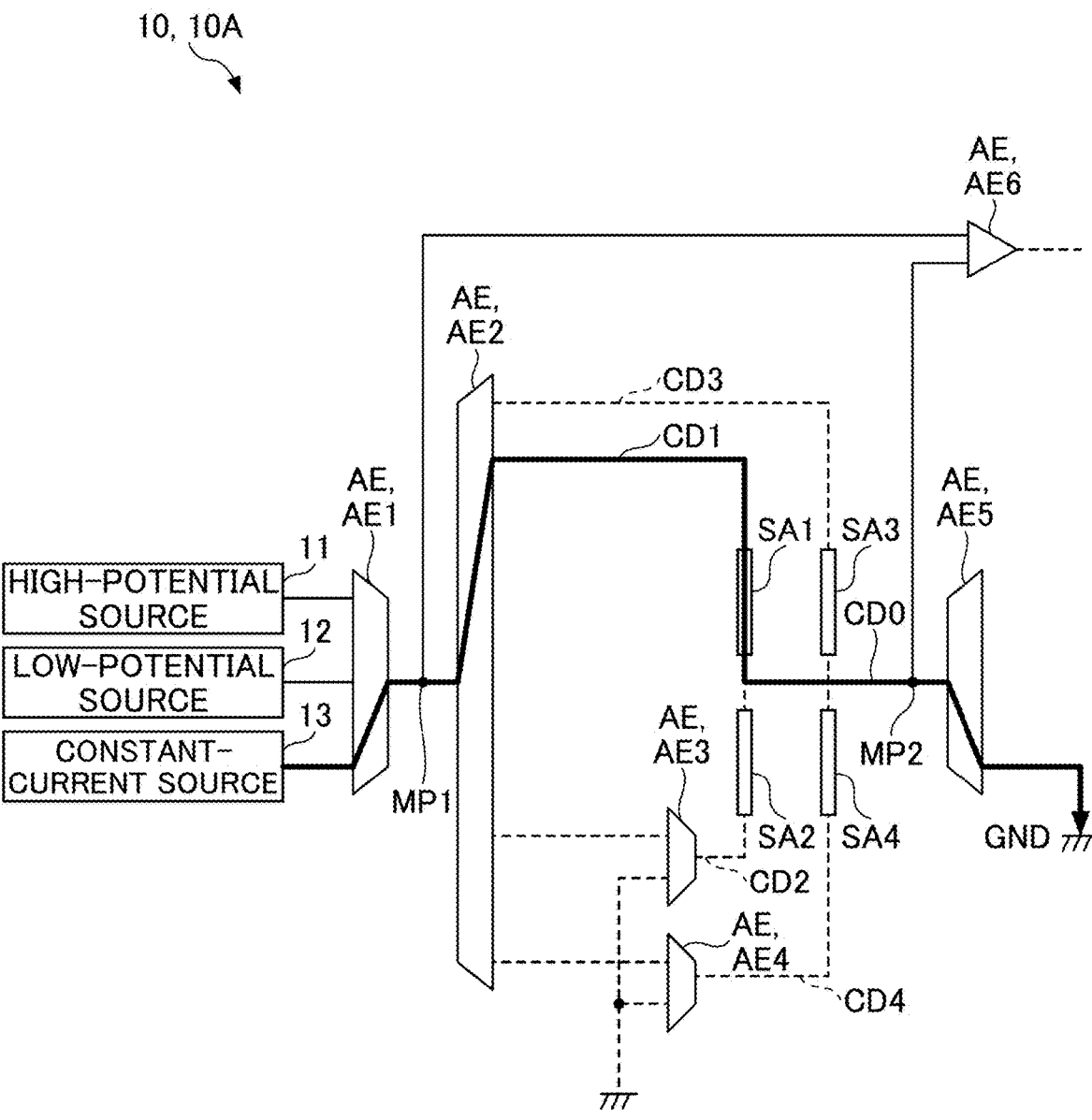
FIG. 10D is a diagram illustrating still another example of the path of the current in the driver.

FIG. 10D illustrates an example of the path of the measurement current flowing through one shape memory alloy wire SA (first wire SA1). The path of the current as illustrated in FIG. 7B is a specific example of the path of the current as illustrated in FIG. 10D. Specifically, FIG. 10D illustrates the path of the measurement current flowing from the constant-current source 13 to the ground (GND) when the constant-current source 13, the first conductive path CD1, the first wire SA1, the common conductive path CD0, and the ground (GND) are electrically connected in series. In this case, the first conductive path CD1 is achieved by the first conductive member CM1 and the first fixed terminal plate 5F1 in FIG. 7B, and the common conductive path CD0 is achieved by the first movable terminal plate 5M1, the first leaf spring 6A (the third portion 6A3, the fifth portion 6A5, and the second portion 6A2), and the sixth conductive member CM6 in FIG. 7B.

In this state, one of the inputs of the sixth active element AE6 is connected to the first measurement point MP1 on the conductive path between the first active element AE1 and the second active element AE2, and the other input of the sixth active element AE6 is connected to the second measurement point MP2 on the common conductive path CD0. Therefore, the sixth active element AE6, serving as the operational amplifier, outputs a potential difference (voltage) between the potential at the first measurement point MP1 and the potential at the second measurement point MP2, to the controller 20. The controller 20 can calculate the magnitude of the resistance of the first wire SA1 in accordance with the magnitude of the voltage and the magnitude of the current output by the constant-current source 13. The controller 20 can calculate the magnitude of the resistance of each of the second wire SA2 to the fourth wire SA4 in the same manner as in the first wire SA1.

Figure 11:
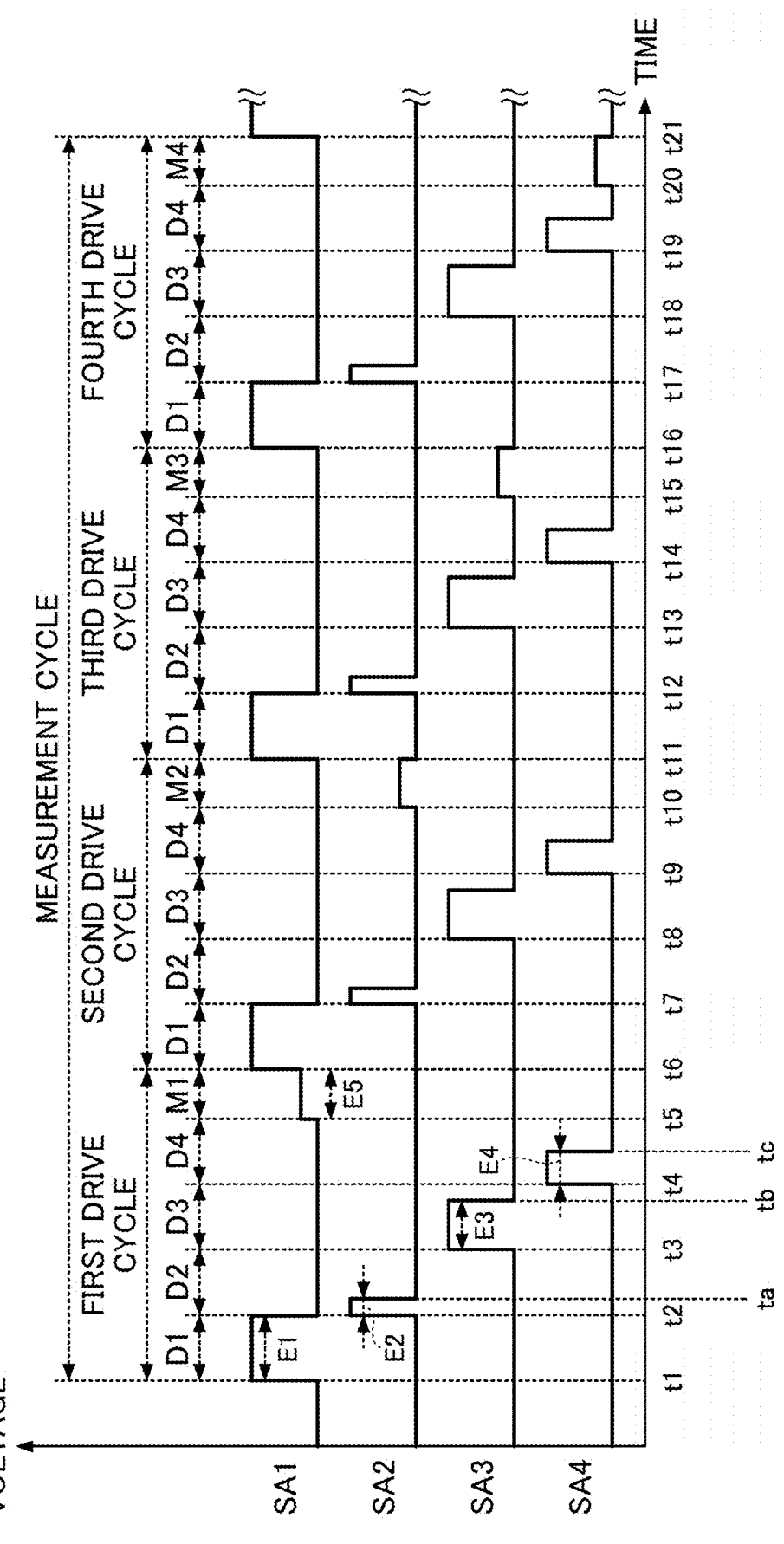
FIG. 11 is an example of a timing chart of a driving current and a measurement current flowing through the shape memory alloy wires.

Next, an example of a relationship in timing between the driving current and the measurement current flowing through the shape memory alloy wire SA will be described with reference to FIG. 11. FIG. 11 is an example of a timing chart of the driving current and the measurement current flowing through the first wire SA1 to the fourth wire SA4. Specifically, FIG. 11 illustrates a relationship in timing between the driving current and the measurement current flowing through the first wire SA1 to the fourth wire SA4 by showing change over time in the voltage applied to the first wire SA1 to the fourth wire SA4. The following description to be made with reference to FIG. 11 relates to the relationship in timing between the driving current and the measurement current flowing through the first wire SA1 to the fourth wire SA4. However, the same applies to the relationship in timing between the driving current and the measurement current flowing through the fifth wire SA5 to the eighth wire SA8.

In the example as illustrated in FIG. 11, control of the driver 10 by the controller 20 is achieved by a pulse width modulation method. The control of the driver 10 by the controller 20 may be achieved by another method, such as a pulse amplitude modulation method or the like.

Specifically, the controller 20 controls the driver 10 such that the driving current flows through the first wire SA1 during a period of a first drive time slot D1, the driving current flows through the second wire SA2 during a period of a second drive time slot D2, the driving current flows through the third wire SA3 during a period of a third drive time slot D3, and the driving current flows through the fourth wire SA4 during a period of a fourth drive time slot D4.

The first drive time slot D1 is a time slot that is set in advance as a period during which the driving current can flow through the first wire SA1. The same applies to the second drive time slot D2 to the fourth drive time slot D4. In the illustrated example, the driver 10 is configured such that the first drive time slot D1 to the fourth drive time slot D4 have the same slot size (duration). However, the driver 10 may be configured such that the first drive time slot D1 to the fourth drive time slot D4 have different slot sizes (durations).

The controller 20 controls the driver 10 such that the measurement current flows through the first wire SA1 during a period of a first measurement time slot M1, the measurement current flows through the second wire SA2 during a period of a second measurement time slot M2, the measurement current flows through the third wire SA3 during a period of a third measurement time slot M3, and the measurement current flows through the fourth wire SA4 during a period of a fourth measurement time slot M4.

The first measurement time slot M1 is a time slot that is set in advance as a period during which the measurement current can flow through the first wire SA1. The driving current is not supplied to the first wire SA1 to the fourth wire SA4 during the period of the first measurement time slot M1. Therefore, the period of the first measurement time slot M1 is also referred to as a "PWM OFF period" when the pulse width modulation method is employed. The same applies to the second measurement time slot M2 to the fourth measurement time slot M4. In the illustrated example, the driver 10 is configured such that the first measurement time slot M1 to the fourth measurement time slot M4 have the same slot size (duration). However, the driver 10 may be configured such that the first measurement time slot M1 to the fourth measurement time slot M4 have different slot sizes (durations). In the illustrated example, the duration of application of the measurement current is the same as the duration of the measurement current may be shorter or longer than the duration of the measurement time slot.

Also, in the illustrated example, the controller 20 controls the driver 10 such that a combination of the first to fourth drive time slots D1 to D4 and the first measurement time slot M1 forms a first drive cycle, a combination of the first to fourth drive time slots D1 to D4 and the second measurement time slot M2 forms a second drive cycle, a combination of the first to fourth drive time slots D1 to D4 and the third measurement time slot M3 forms a third drive cycle, and a combination of the first to fourth drive time slots D1 to D4 and the fourth measurement time slot M4 forms a fourth drive cycle.

In the illustrated example, the controller 20 controls the driver 10 such that the first measurement time slot M1 is set after the first to fourth drive time slots D1 to D4 in the first drive cycle. However, the controller 20 may control the driver 10 such that the first measurement time slot is set between the two drive time slots. For example, the controller 20 may control the driver 10 such that the first measurement time slot M1 is set between the first drive time slot D1 and the second drive time slot D2. The same applies to the second drive cycle to the fourth drive cycle.

Also, in the illustrated example, the controller 20 controls the driver 10 such that a combination of the first drive cycle, the second drive cycle, the third drive cycle, and the fourth drive cycle forms a single measurement cycle. That is, the controller 20 controls the driver 10 so as to obtain the magnitude of resistance of each of the four shape memory alloy wires SA (first wire SA1 to fourth wire SA4) by performing the single measurement cycle.

In the illustrated example, the controller 20 controls the driver 10 such that the four drive cycles are performed in the order of the first drive cycle, the second drive cycle, the third drive cycle, and the fourth drive cycle. However, the controller 20 may control the driver 10 such that the four drive cycles are performed in any other order.

In the illustrated example, the controller 20 controls the driver 10 so as to obtain the magnitude of resistance of one of the shape memory alloy wires SA by performing the single drive cycle. However, the controller 20 may control the driver 10 so as to obtain the magnitudes of resistances of two or more of the shape memory alloy wires SA by performing the single drive cycle. For example, the first drive cycle may be a combination of: the first to fourth drive time slots D1 to D4; and the first and second measurement time slots M1 and M2. In this case, the second measurement time slot M2 in the second drive cycle may be omitted.

In the example as illustrated in FIG. 11, the first drive time slot D1 of the first drive cycle starts at a point-of-time of t1, the first drive time slot D1 ends and the second drive time slot D2 starts at a point-of-time of t2, the second drive time slot D2 ends and the third drive time slot D3 starts at a point-of-time of t3, the third drive time slot D3 ends and the fourth drive time slot D4 starts at a point-of-time of t4, the fourth drive time slot D4 ends and the first measurement time slot M1 starts at a point-of-time of t5, and the first measurement time slot M1 ends and the first drive time slot D1 of the second drive cycle starts at a point-of-time of t6.

In the first drive time slot D1 of the first drive cycle, the controller 20 controls the driver 10 such that the driving current flows through the first wire SA1 over a duration of E1 equal to the duration of the first drive time slot D1. In the second drive time slot D2 of the first drive cycle, the controller 20 controls the driver 10 such that the driving current flows through the second wire SA2 over a duration of E2 shorter than the duration of the second drive time slot D2. In the third drive time slot D3 of the first drive cycle, the controller 20 controls the driver 10 such that the driving current flows through the third wire SA3 over a duration of E3 shorter than the duration of the third drive time slot D3. In the fourth drive time slot D4 of the first drive cycle, the controller 20 controls the driver 10 such that the driving current flows through the fourth wire SA4 over a duration of E4 shorter than the duration of the fourth drive time slot D4. In the first measurement time slot M1 of the first drive cycle, the controller 20 controls the driver 10 such that the measurement current flows through the first wire SA1 over a duration of E5 equal to the duration of the first measurement time slot M1.

The duration of E5 during which the measurement current flows through the first wire SA1 is set, for example, in accordance with a conversion speed of the AD converter configured to convert an analog signal to a digital signal, the analog signal being output by the sixth active element AE6 serving as the operational amplifier. As the conversion speed of the AD converter is higher, the duration of E5 can be set to be shorter. In other words, when the duration of E5 is set to be longer, the controller 20 can accurately obtain resistances of the four shape memory alloy wires SA even if the AD converter with a low conversion speed is used.

In a configuration in which the resistance of the first wire SA1 is measured while the driving current is flowing through the first wire SA1, the duration of E1 during which the driving current flows through the first wire SA1 needs to be set to be longer than the minimum duration determined in accordance with the conversion speed of the AD converter. However, according to the configuration according to the present embodiment, the first drive time slot D1 and the first measurement time slot M1 are set separately, and thus the duration of E1 does not necessarily need to be equal to or longer than the duration of E5. That is, the controller 20 can employ, as the duration of E1, a duration shorter than the duration of E5 during which the measurement current flows through the first wire SA1. The same applies to the second wire SA2 to the fourth wire SA4.

In the illustrated example, the driver 10 includes the first driver 10A configured to drive the first wire SA1 to the fourth wire SA4, and the second driver 10B configured to drive the fifth wire SA5 to the eighth wire SA8. That is, the imaging apparatus 101 includes two drivers each configured to drive four of the shape memory alloy wires SA. Compared to a configuration that includes only one driver configured to drive the eight shape memory alloy wires SA, this configuration can increase a drive time slot that can be assigned to one of the shape memory alloy wires SA, can reduce the quantity of the current when supplying a desired quantity of power to one of the shape memory alloy wires SA, and can reduce the magnetic field formed around the conductive path. However, the imaging apparatus 101 may include only one driver configured to drive the eight shape memory alloy wires SA. In this case, for example, the controller 20 may control the only one driver such that one measurement cycle includes eight drive cycles, and each of the drive cycles includes a combination of eight drive time slots and one measurement time slot. Alternatively, the imaging apparatus 101 may include four drivers each configured to drive two of the shape memory alloy wires SA. Alternatively, the imaging apparatus 101 may include eight drivers each configured to drive one of the shape memory alloy wires SA.

Also, in the illustrated example, the controller 20 controls the driver 10 such that the driving current is supplied to one of the shape memory alloy wires SA in one drive time slot. However, the controller 20 may control the driver 10 such that the driving current is supplied simultaneously to the multiple shape memory alloy wires SA in one drive time slot. Even if the driving current is supplied simultaneously to the multiple shape memory alloy wires SA in one drive time slot, the controller 20 can accurately measure the resistance value of each of the multiple shape memory alloy wires SA because the drive time slots and the measurement time slots are separated. Specifically, in a configuration in which the resistance value of the shape memory alloy wire of interest is measured while the driving current is being supplied to the shape memory alloy wire of interest, when the driving current (measurement current) is supplied simultaneously to the multiple shape memory alloy wires, the resistance value of each of these multiple shape memory alloy wires cannot be accurately measured. This is because the magnitudes of the driving currents (measurement currents) flowing through the multiple shape memory alloy wires influence each other and become unstable. Meanwhile, the configuration including the drive time slots and the measurement time slots that are separated does not raise such an issue.

Figure 12A:
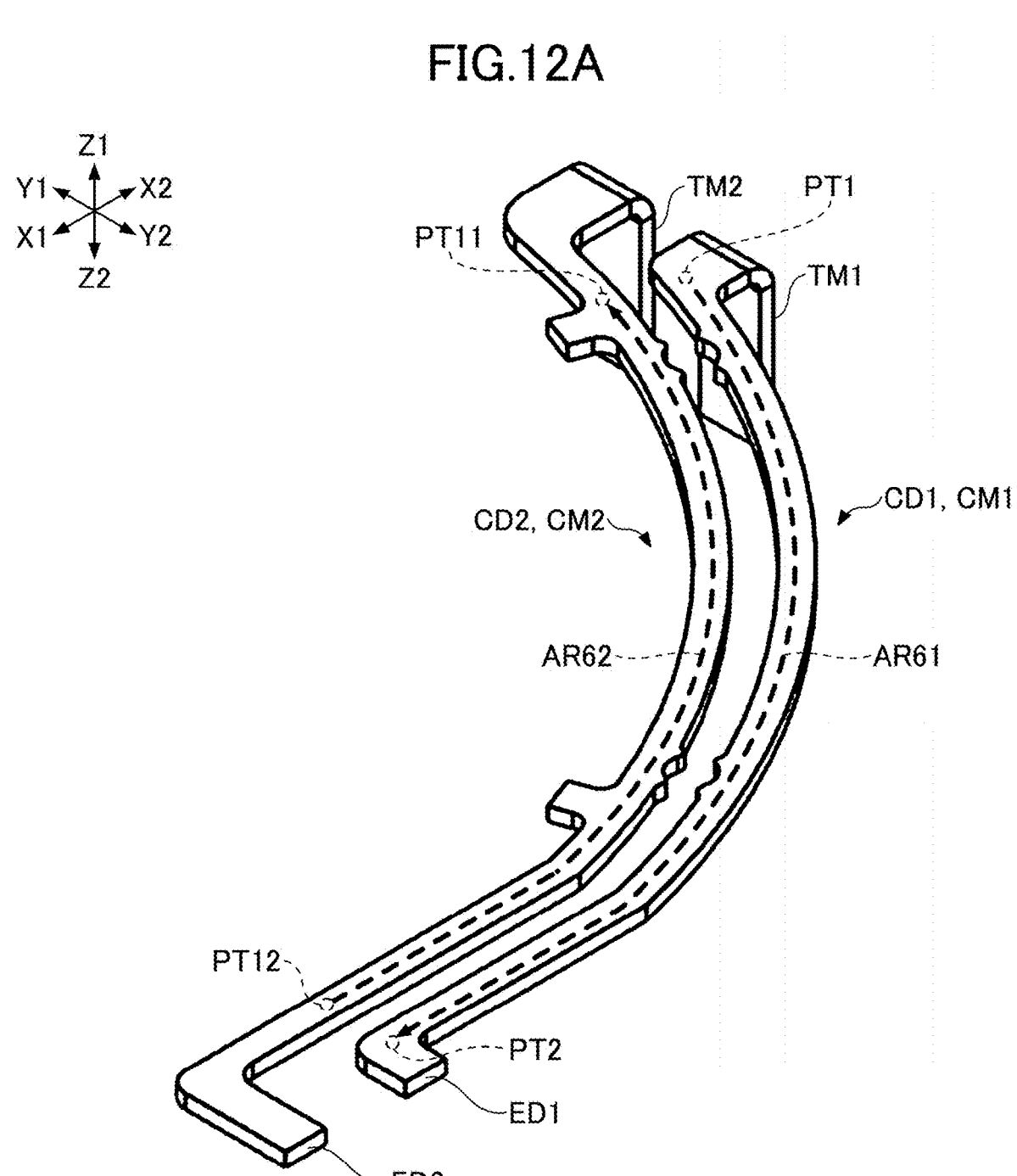
FIG. 12A is a perspective view of a first conductive member and a second conductive member.
Figure 12B:
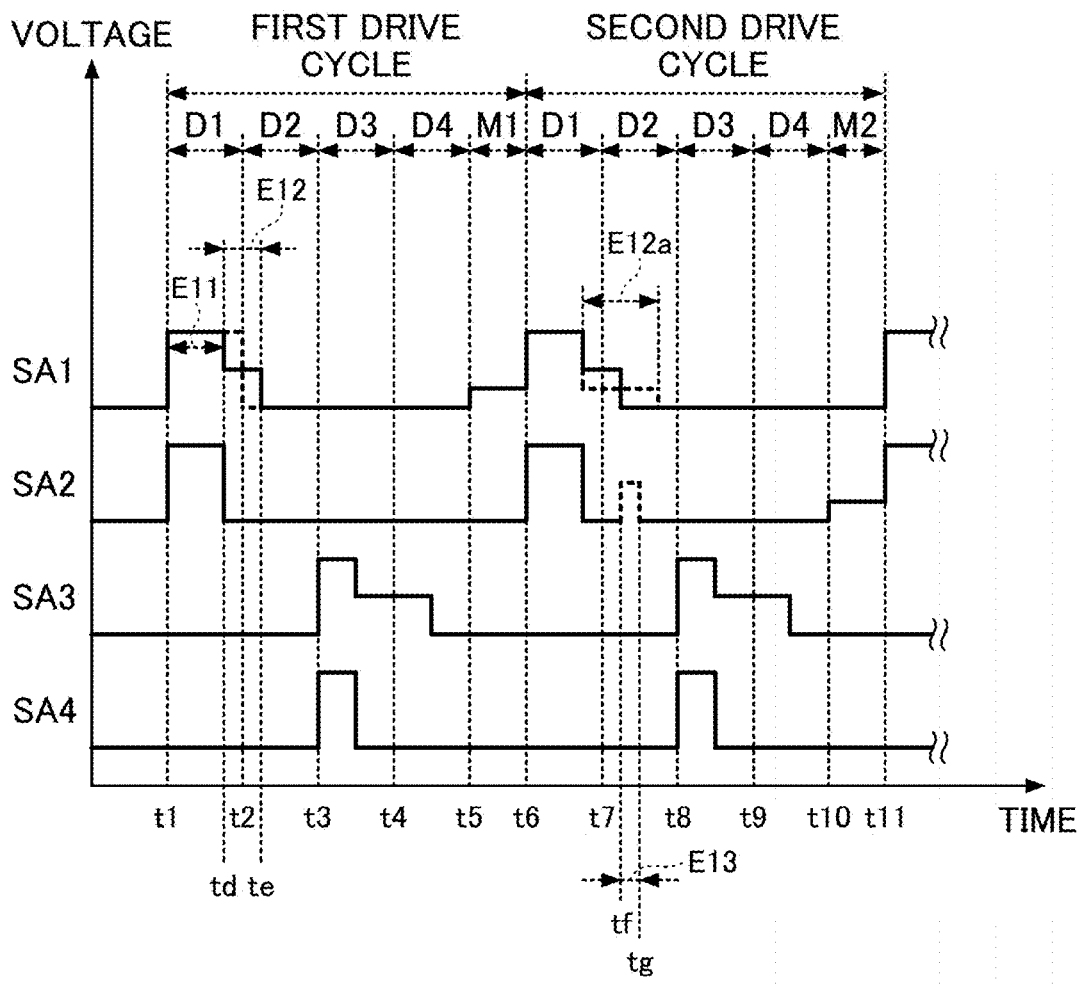
FIG. 12B is another example of the timing chart of the driving current and the measurement current flowing through the shape memory alloy wires.

Next, another example of the relationship in timing between the driving current and the measurement current flowing through the shape memory alloy wires SA will be described with reference to FIGS. 12A and 12B. FIG. 12A is a perspective view of the first conductive member CM1 forming a part of the first conductive path CD1 (see FIG. 9) and the second conductive member CM2 forming a part of the second conductive path CD2 (see FIG. 9). FIG. 12B is another example of the timing chart of the driving current and the measurement current flowing through the first wire SA1 to the fourth wire SA4, and corresponds to FIG. 11. Specifically, FIG. 12B illustrates the relationship in timing between the driving current and the measurement current flowing through the first wire SA1 to the fourth wire SA4 by showing change over time in the voltage applied to the first wire SA1 to the fourth wire SA4. The following description to be made with reference to FIG. 12A relates to the current flowing through the first conductive member CM1 and the second conductive member CM2. However, the same applies to the current flowing through the third conductive member CM3 and the fourth conductive member CM4. The following description to be made with reference to FIGS. 12A and 12B relates to the relationship in timing between the driving current and the measurement current flowing through the first wire SA1 to the fourth wire SA4. However, the same applies to the relationship in timing between the driving current and the measurement current flowing through the fifth wire SA5 to the eighth wire SA8.

In the example as illustrated in FIG. 12B, the controller 20 controls the driver 10 such that the driving current flows through the first wire SA1 and the second wire SA2 during a combined period of the first drive time slot D1 and the second drive time slot D2, and the driving current flows through the third wire SA3 and the fourth wire SA4 during a combined period of the third drive time slot D3 and the fourth drive time slot D4.

Specifically, the controller 20 controls the driver 10 such that the driving current flows simultaneously through the first wire SAL and the second wire SA2 over a period of from a point-of-time of t1 to a point-of-time td, i.e., for a duration of E11 shorter than the duration of the first drive time slot D1.

More specifically, the controller 20 controls the driver 10 such that a relatively large quantity of current is supplied simultaneously to the first wire SA1 and the second wire SA2 by electrically connecting, in series, the high-potential source 11, the first conductive path CD1, the first wire SA1, the common conductive path CD0, the second wire SA2, the second conductive path CD2, and the ground (GND) as illustrated in FIG. 10A. That is, the controller 20 controls the driver 10 such that the current flows from a first point PT1 to a second point PT2 of the first conductive path CD1 (the first conductive member CM1) as indicated by an arrow AR61 in FIG. 12A, and at the same time, the current flows from a second point PT12 to a first point PT11 of the second conductive path CD2 (the second conductive member CM2) as indicated by an arrow AR62 in FIG. 12A. Hereinafter, the operation mode of the driver 10 at this time is referred to as a "first mode", and the state of the imaging apparatus 101 at this time is referred to as a "strongly driven state". Also, this state is referred to as a "commonly driven state" because the first wire SA1 and the second wire SA2 are driven simultaneously.

In this "strongly driven state", the direction of the current flowing through the first conductive path CD1 (the first conductive member CM1) (the direction indicated by the arrow AR61) is opposite to the direction of the current flowing through the second conductive path CD2 (the second conductive member CM2) (the direction indicated by the arrow AR62). Therefore, the magnetic field formed around the first conductive path CD1 (the first conductive member CM1) cancels the magnetic field formed around the second conductive path CD2 (the second conductive member CM2). As a result, the net magnetic field (induced magnetic field) that can adversely influence the quality of an image formed by the imaging element is reduced or extinguished.

Also, when the controller 20 causes the driver 10 to perform the "first mode" that achieves the "commonly driven state", the controller 20 provides the effect of being able to elongate the "PWM OFF period" with the pulse width modulation method being employed, compared to a case in which the controller 20 does not cause the driver 10 to perform the "first mode".

Subsequently, the controller 20 controls the driver 10 such that the driving current flows through either the first wire SAL or the second wire SA2 during the remaining period of the combined period of the first drive time slot D1 and the second drive time slot D2, and the driving current flows through either the third wire SA3 or the fourth wire SA4 during the remaining period of the combined period of the third drive time slot D3 and the fourth drive time slot D4.

In the example as illustrated in FIG. 12B, the controller 20 controls the driver 10 such that the driving current flows only through the first wire SA1 over a period of from a point-of-time of td to a point-of-time of the, i.e., for a duration of E12 shorter than the duration of the first drive time slot D1.

More specifically, the controller 20 controls the driver 10 such that a relatively small quantity of current is supplied to the first wire SA1 by electrically connecting, in series, the low-potential source 12, the first conductive path CD1, the first wire SA1, the common conductive path CD0, and the ground (GND) as illustrated in FIG. 10B. That is, the controller 20 controls the driver 10 such that the current flows from the first point PT1 to the second point PT2 of the first conductive path CD1 (the first conductive member CM1), and the current does not flow through the second conductive path CD2 (the second conductive member CM2) as indicated by the arrow AR61 in FIG. 12A. Hereinafter, the operation mode of the driver 10 at this time is referred to as a "second mode", and the state of the imaging apparatus 101 at this time is referred to as a "weakly driven state" or a "first weakly driven state".

In the example as illustrated in FIG. 12B, the sum of the quantity of power supplied to the first wire SA1 in the "strongly driven state" of the first drive cycle and the quantity of power supplied to the first wire SA1 in the "first weakly driven state" of the first drive cycle corresponds to the quantity of power supplied to the first wire SA1 when the high-potential source 11 and the first wire SA1 are connected over the duration of the first drive time slot D1. In FIG. 12B, voltage waveforms shown with a dotted line are those formed assuming that the high-potential source 11 and the first wire SAL are connected over the duration of the first drive time slot D1.

Also, the magnitude of the current flowing through the first conductive path CD1 (the first conductive member CM1) becomes smaller in the "first weakly driven state" than in the "strongly driven state", and thus the magnitude of the magnetic field formed around the first conductive path CD1 (the first conductive member CM1) is reduced in the "first weakly driven state". As a result, even if no current is supplied to the second conductive path CD2 (the second conductive member CM2) and no magnetic field that cancels the magnetic field formed around the first conductive path CD1 (the first conductive member CM1) is formed, the magnetic field (induced magnetic field) that can adversely influence the quality of an image formed by the imaging element is reduced commensurately with reduction in the magnitude of the current flowing through the first conductive path CD1 (the first conductive member CM1).

Also, the controller 20 may control the driver 10 such that the driving current flows only through the second wire SA2 during the remaining period of the combined period of the first and second drive time slots D1 and D2, i.e., after the controller 20 causes the driver 10 to perform the "first mode" during the combined period of the first and second drive time slots D1 and D2.

More specifically, the controller 20 may control the driver 10 such that a relatively small quantity of current is supplied to the second wire SA2 by electrically connecting, in series, the low-potential source 12, the second conductive path CD2, the second wire SA2, the common conductive path CD0, and the ground (GND) as illustrated in FIG. 10C. That is, the controller 20 may control the driver 10 such that the current flows from the first point PT11 to the second point PT12 of the second conductive path CD2 (the second conductive member CM2) and does not flow through the first conductive path CD1 (the first conductive member CM1). Hereinafter, the operation mode of the driver 10 at this time is referred to as a "third mode", and the state of the imaging apparatus 101 at this time is referred to as a "weakly driven state" or a "second weakly driven state".

Also, the controller 20 may control the driver 10 so as to perform the "third mode" after the controller 20 causes the driver 10 to perform the "first mode" and the "second mode" during a combined period of the first drive time slot D1 and the second drive time slot D2. For example, the controller 20 may control the driver 10 such that the driving current flows only through the second wire SA2 over a period of from a point-of-time of tf to a point-of-time of tg, i.e., for a duration of E13 shorter than the duration of the second drive time slot D2. This is for fine-tuning of the quantity of power supplied to the second wire SA2, for example. In FIG. 12B, voltage waveforms shown with a dotted line are those formed assuming that the low-potential source 12 and the second wire SA2 are connected over the period of from the point-of-time of tf to the point-of-time of tg. As described above, the driver 10 may be configured to perform the "first mode", the "second mode", and the "third mode" in combination.

The state of the imaging apparatus 101 in which the controller 20 causes the driver 10 to perform the "second mode" or the "third mode" is also referred to as an "individually driven state" because the first wire SA1 and the second wire SA2 are individually driven.

The controller 20 can supply a desired quantity of power to the four shape memory alloy wires SA (the first wire SA1 to the fourth wire SA4) by causing the driver 10 to perform a combined mode in which the "first mode" is combined with the "second mode" or the "third mode". The "first mode" related to the first wire SA1 and the second wire SA2 can be more effective as the quantity of power to be supplied to the first wire SA1 and the quantity of power to be supplied to the second wire SA2 are larger and as the difference therebetween is smaller. This is because a large quantity of power can be supplied to the first wire SA1 and the second wire SA2 in a short time while suppressing any adverse influence on the quality of an image formed by the imaging element. Also, as the difference between the quantity of power to be supplied to the first wire SA1 and the quantity of power to be supplied to the second wire SA2 is larger, the "second mode" or the "third mode" becomes more dominant over time. However, the controller 20 can reduce any adverse influence on the quality of an image formed by the imaging element by increasing the duration of the "second mode" or the "third mode" to the extent possible. This is because it is possible to reduce the current flowing through the first conductive path CD1 (the first conductive member CM1) or the second conductive path CD2 (the second conductive member CM2) and to reduce the magnetic field formed around the first conductive path CD1 (the first conductive member CM1) or the second conductive path CD2 (the second conductive member CM2).

In the illustrated example, when the controller 20 causes the driver 10 to perform the "second mode", the controller 20 controls the driver 10 such that the first wire SA1 is connected to the low-potential source 12 having a fixed potential as illustrated in FIG. 10B. However, when the controller 20 causes the driver 10 to perform the "second mode", the controller 20 may control the driver 10 such that a variable potential source having an adjustable potential is connected to the first wire SA1. In this case, the controller 20 may elongate the duration of E12 to the duration of E12a while reducing the potential of the variable potential source compared to the potential of the low-potential source 12, thereby controlling the driver 10 such that the quantity of power equal to that supplied to the first wire SA1 connected to the low-potential source 12 is supplied to the first wire SA1. That is, the controller 20 may elongate the duration of E12a to the extent possible in order to reduce the potential of the variable potential source to the extent possible. In FIG. 12B, voltage waveforms shown with a dotted line are those formed assuming that the variable potential source and the first wire SAL are connected over the duration of E12a. The state of the imaging apparatus 101 at this time is referred to as a "variable weakly driven state". The magnitude of the current flowing through the first conductive path CD1 (the first conductive member CM1) becomes smaller in this "variable weakly driven state" than in the "first weakly driven state", and the magnitude of the magnetic field formed around the first conductive path CD1 (the first conductive member CM1) is further reduced in the "variable weakly driven state". The same applies to the case in which the controller 20 causes the driver 10 to perform the "third mode".

Modification of the magnitude of the potential of the variable potential source is preferably made such that the modified interval is much longer than the interval of the measurement cycle. In the example as illustrated in FIG. 12B, this modification is performed in synchronization with the measurement cycle. For example, the modification may be made every time the resistance value of each of the four shape memory alloy wires SA (the first wire SA1 to the fourth wire SA4) is obtained by performing the single measurement cycle including the first drive cycle, the second drive cycle, the third drive cycle, and the fourth drive cycle. In this case, the modification may be made during the period of the fourth measurement time slot M4.

Figure 13:
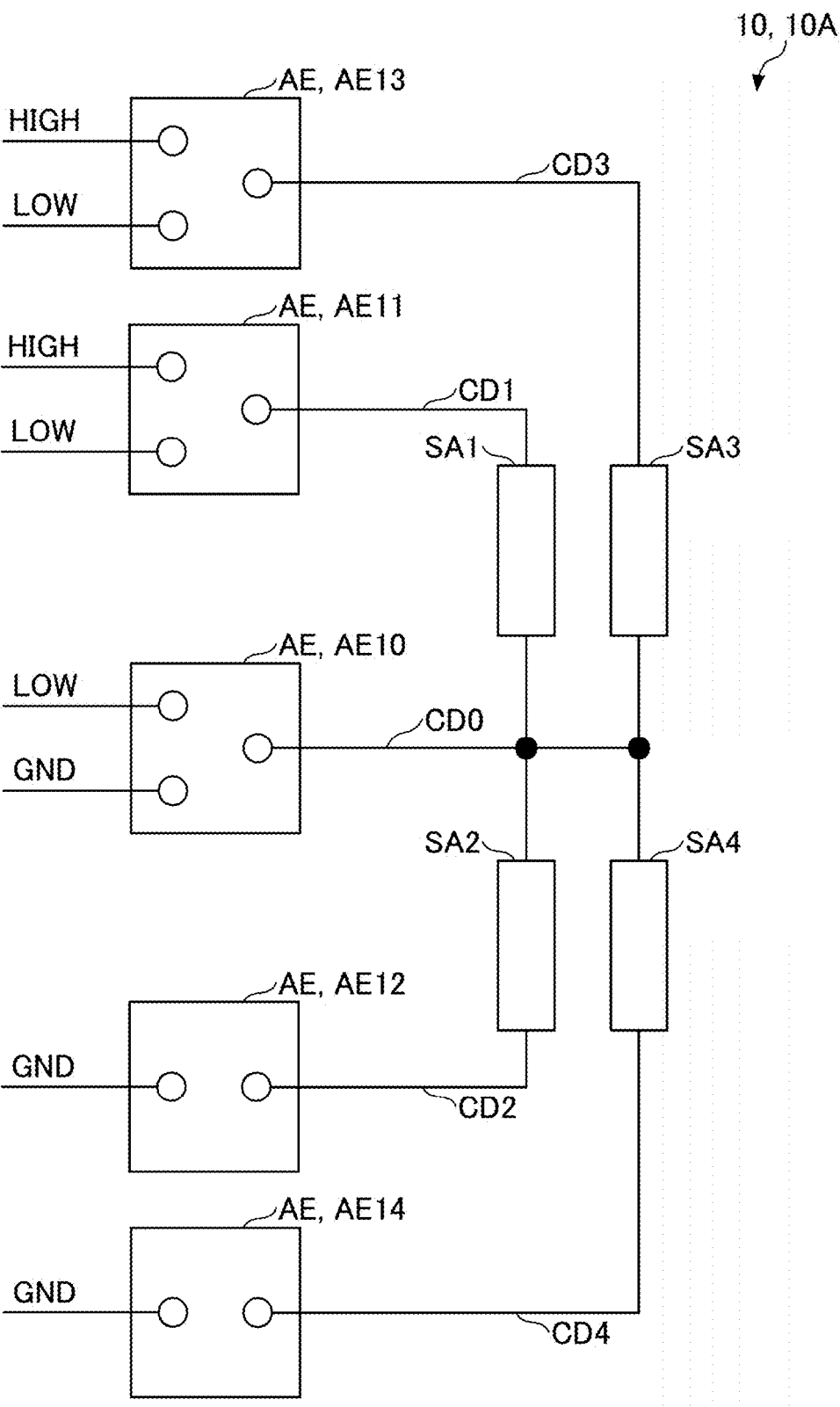
FIG. 13 is a diagram illustrating another configuration example of the driver.

Next, another configuration example of the driver 10 will be described with reference to FIG. 13. FIG. 13 is a diagram illustrating another configuration example of the driver 10. The following description to be made with reference to FIG. 13 relates to the first driver 10A configured to drive the first wire SA1 to the fourth wire SA4. However, the same applies to the second driver 10B configured to drive the fifth wire SA5 to the eighth wire SA8. For clarification, FIG. 13 omits illustration of some components, such as an active element configured to estimate the resistance values of the first wire SA1 to the fourth wire SA4, and the like. However, such components are connected in practice.

The first driver 10A as illustrated in FIG. 13 differs from the first driver 10A as illustrated in FIG. 9 in that the first driver 10A includes five active elements AE (a tenth active element AE10 to a fourteenth active element AE14).

The tenth active element AE10 is a switching element configured to control connection between: the common conductive path CD0 connected to the other end of each of the first wire SA1 to the fourth wire SA4; and either the low-potential source (LOW) or the ground (GND).

The eleventh active element AE11 is a switching element configured to control connection between: the first conductive path CD1 connected to one end of the first wire SA1; and either the high-potential source (HIGH) or the low-potential source (LOW).

The twelfth active element AE12 is a switching element configured to control connection between: the second conductive path CD2 connected to one end of the second wire SA2; and the ground (GND).

The thirteenth active element AE13 is a switching element configured to control connection between: the third conductive path CD3 connected to one end of the third wire SA3; and either the high-potential source (HIGH) or the low-potential source (LOW).

The fourteenth active element AE14 is a switching element configured to control connection between: the fourth conductive path CD4 connected to one end of the fourth wire SA4; and the ground (GND).

By controlling the eleventh active element AE11 and the twelfth active element AE12 such that the high-potential source (HIGH), the first conductive path CD1, the first wire SA1, the common conductive path CD0, the second wire SA2, and the ground (GND) are electrically connected in series, the controller 20 can supply a relatively large quantity of current simultaneously to the first wire SA1 and the second wire SA2. Also, by controlling the tenth active element AE10 and the eleventh active element AE11 such that the low-potential source (LOW), the first conductive path CD1, the first wire SA1, the common conductive path CD0, and the ground (GND) are electrically connected in series, the controller 20 can supply a relatively small quantity of current only to the first wire SA1. Also, by controlling the tenth active element AE10 and the twelfth active element AE12 such that the low-potential source (LOW), the common conductive path CD0, the second wire SA2, the second conductive path CD2, and the ground (GND) are electrically connected in series, the controller 20 can supply a relatively small quantity of current only to the second wire SA2.

Similarly, by controlling the thirteenth active element AE13 and the fourteenth active element AE14 such that the high-potential source (HIGH), the third conductive path CD3, the third wire SA3, the common conductive path CD0, the fourth wire SA4, and the ground (GND) are electrically connected in series, the controller 20 can supply a relatively large quantity of current simultaneously to the third wire SA3 and the fourth wire SA4. Also, by controlling the tenth active element AE10 and the thirteenth active element AE13 such that the low-potential source (LOW), the third conductive path CD3, the third wire SA3, the common conductive path CD0, and the ground (GND) are electrically connected in series, the controller 20 can supply a relatively small quantity of current only to the third wire SA3. Also, by controlling the tenth active element AE10 and the fourteenth active element AE14 such that the low-potential source (LOW), the common conductive path CD0, the fourth wire SA4, the fourth conductive path CD4, and the ground (GND) are electrically connected in series, the controller 20 can supply a relatively small quantity of current only to the fourth wire SA4.

In the example as illustrated in FIG. 13, the high-potential source (HIGH) has a fixed potential. However, the high-potential source (HIGH) may be configured to dynamically change in the potential in accordance with a control signal from the controller 20. Conversely, the low-potential source (LOW) is configured to dynamically change in the potential in accordance with a control signal from the controller 20. However, the low-potential source (LOW) may have a fixed potential.

Alternatively, the driver 10 as illustrated in FIG. 13 may be configured to selectively connect one end of each of the first wire SA1 to the fourth wire SA4 to the ground (GND) via an active element, such as an N-channel transistor or the like, in a state in which the common conductive path CD0, to which the other end of each of the first wire SA1 to the fourth wire SA4 is connected, is connected to a potential source having a potential of 3 V or the like.

Even in such a configuration, the driver 10 can perform a combined mode in which the "first mode" is combined with the "second mode" or the "third mode". Also, the driver 10 may perform a combined mode in which the "first mode", the "second mode", and the "third mode" are combined. Also, the driver 10 can supply the measurement current to each of the eight shape memory alloy wires SA at a timing different from the timing at which the driving current is supplied.

As described above, the imaging apparatus 101 according to the embodiment of the present disclosure includes: as illustrated in FIG. 2, the fixed member FB including the base member 18 serving as the fixed base; the movable member MB that is movable relative to the fixed member FB, the movable member MB including the lens holder 2 configured to hold the lens body; the multiple shape memory alloy wires SA in each of which one end thereof is fixed to the fixed member FB and another end thereof is fixed to the movable member MB, the multiple shape memory alloy wires SA being configured to move the movable member MB; the driver 10 configured to supply a driving current to each of the multiple shape memory alloy wires SA and drive each of the multiple shape memory alloy wires SA (see FIG. 9); and the controller 20 configured to obtain a resistance value of each of the multiple shape memory alloy wires SA and control the driver 10 (see FIG. 9). The controller 20 is configured to obtain the resistance values (measured resistance values) of the multiple shape memory alloy wires SA by controlling the driver 10 such that the measurement current is supplied to each of the multiple shape memory alloy wires SA at a timing different from the timing at which the driving current is supplied.

The controller 20 is configured to set the target length (the target resistance value) of each of the eight shape memory alloy wires SA corresponding to a desired posture of the lens holder 2 (lens body). The controller 20 is configured to achieve a desired posture of the lens holder 2 (lens body) by controlling the driver 10 such that the difference between the measured resistance value and the target resistance value of each of the eight shape memory alloy wires SA becomes closer to zero. Also, the controller 20 can increase the quantity of power supplied to a specific one of the shape memory alloy wires SA and shrink the specific shape memory alloy wire SA, thereby reducing the measured resistance value.

This configuration provides the effect of being able to more accurately estimate the length of the shape memory alloy wires SA. This is because in this configuration, the duration during which the measurement current is supplied is set independently of the duration during which the driving current is supplied. That is, in this configuration, the duration during which the measurement current is supplied is set to a necessary and sufficient length.

Also, in a case in which an AD converter configured to detect voltages at both ends of the shape memory alloy wire SA is included in order to derive the resistance value of the shape memory alloy wire SA, this configuration provides the effect of being able to set the operation speed of the AD converter to be low, i.e., utilize a relatively inexpensive AD converter. This is because in this configuration, the measurement current is supplied to the shape memory alloy wires SA at a timing different from the timing the driving current is supplied, i.e., the duration during which the supply of the measurement current continues is set relatively freely.

Also, the controller 20 may control the driver 10 so as to supply the driving current to the multiple shape memory alloy wires SA at different timings.

This configuration provides the effect of being able to more accurately control stretching of each of the multiple shape memory alloy wires SA. This is because this configuration can prevent a part of the driving current to be supplied to a specific one of the shape memory alloy wires SA, from being supplied to another one of the shape memory alloy wires SA.

Also, the controller 20 may control the driver 10 so as to supply the measurement current to the multiple shape memory alloy wires SA at different timings.

This configuration provides the effect of being able to more accurately obtain the resistance values of the multiple shape memory alloy wires SA. This is because this configuration can prevent a part of the measurement current to be supplied to a specific one of the shape memory alloy wires SA, from being supplied to another one of the shape memory alloy wires SA.

Also, the controller 20 may control the driver 10 such that the shortest duration during which the driving current is continuously supplied to each of the multiple shape memory alloy wires SA is shorter than the duration during which the measurement current is continuously supplied to each of the multiple shape memory alloy wires SA.

This configuration provides the effect of being able to more flexibly adjust the duration during which the driving current is continuously supplied. This is because this configuration can reduce the duration during which the driving current is continuously supplied, compared to the duration during which the measurement current is continuously supplied. Being able to reduce the duration during which the driving current is continuously supplied means being able to reduce the quantity of power supplied to a specific one of the shape memory alloy wires SA in the single drive cycle (drive time slot), i.e., being able to slightly heat the shape memory alloy wires SA, thereby slightly shrinking the shape memory alloy wires SA.

Also, the controller 20 may control the driver 10 such that the magnitude of the measurement current becomes smaller than the magnitude of the driving current.

This configuration provides the effect of being able to reduce the influence of the measurement current on the driving of the shape memory alloy wires SA.

Also, the controller 20 may control the driver 10 so as to supply the driving current to each of the shape memory alloy wires SA once in the single drive cycle and supply the measurement current to one of the shape memory alloy wires SA. Also, the controller 20 may control the driver 10 so as to repeat the drive cycle multiple times and supply the measurement current to each of the shape memory alloy wires SA.

This configuration provides the effect of being able to more smoothly drive the lens holder 2 (lens body). This is because it is possible to supply the driving current to each of the shape memory alloy wires SA at relatively short intervals. Also, it is possible to prevent excessive elongation of the period during which the driving current cannot be supplied to one of the shape memory alloy wires SA.

Also, the controller 20 may control the driver 10 so as to repeat the drive cycle the same times as the number of the shape memory alloy wires SA and supply the measurement current to each of the shape memory alloy wires SA.

This configuration provides the effect of being able to suppress reduction in a control response speed and more smoothly drive the lens holder 2 (lens body). This is because it is possible to supply the measurement current to each of the shape memory alloy wires SA at relatively short intervals. Also, it is possible to prevent excessive elongation of the period during which the measurement current cannot be supplied to one of the shape memory alloy wires SA.

Also, the driver 10 may include: the first driver 10A configured to supply the driving current to each of the four shape memory alloy wires (first wire SA1 to fourth wire SA4) and drive each of the four shape memory alloy wires (first wire SA1 to fourth wire SA4); and the second driver 10B configured to supply the driving current to each of the four other shape memory alloy wires (fifth wire SA5 to eighth wire SA8) and drive each of the four other shape memory alloy wires (fifth wire SA5 to eighth wire SA8).

This configuration provides the effect of being able to reduce the duration required for the single drive cycle. That is, this configuration provides the effect of being able to suppress reduction in a control response speed. Also, compared to the case of including the single driver configured to supply the driving current to each of the eight shape memory alloy wires (first wire SA1 to eighth wire SA8) and drive each of the eight shape memory alloy wires (first wire SA1 to eighth wire SA8), this configuration provides the effect of being able to increase the duration of the measurement time slot without increasing the duration required for the single drive cycle. Therefore, in order to elongate the duration of the measurement time slot, it is not necessary to increase a voltage to be applied at the time of supplying the driving current to the shape memory alloy wires SA. As a result, this configuration can suppress any adverse influence on a resulting image due to noise caused by increasing the voltage to be applied.

As illustrated in FIG. 2, the imaging apparatus 101 according to the embodiment of the present disclosure includes: the fixed member FB including the base member 18 serving as the fixed base; the movable member MB that is movable relative to the fixed member FB, the movable member MB including the lens holder 2 configured to hold the lens body so as to face the imaging element; the first wire SA1, serving as a first shape memory alloy wire, in which one end thereof is fixed to the fixed member FB and the other end thereof is fixed to the movable member MB; the second wire SA2, serving as a second shape memory alloy wire, in which one end thereof is fixed to the fixed member FB and the other end thereof is fixed to the movable member MB; the first conductive path CD1 (see FIG. 9) provided at the base member 18 and electrically connected to the one end of the first wire SA1; the second conductive path CD2 (see FIG. 9) provided at the base member 18 and electrically connected to the one end of the second wire SA2; the common conductive path CD0 (see FIG. 9) electrically connected to the other ends of the first wire SA1 and the second wire SA2; and the driver 10 (see FIG. 9) configured to be electrically connectable to each of the first conductive path CD1, the second conductive path CD2, and the common conductive path CD0, and supply the current to each of the first wire SA1 and the second wire SA2 and drive each of the first wire SA1 and the second wire SA2. As illustrated in FIG. 12A, the portion connecting the first point PT1 and the second point PT2 on the first conductive path CD1 (the first conductive member CM1) and the portion connecting the first point PT11 and the second point PT12 on the second conductive path CD2 (the second conductive member CM2) are disposed to extend side by side in the base member 18. Also, the first point PT1 on the first conductive path CD1 (the first conductive member CM1) is disposed side by side with the first point PT11 on the second conductive path CD2 (the second conductive member CM2), and the second point PT2 on the first conductive path CD1 (the first conductive member CM1) is disposed side by side with the second point PT12 on the second conductive path CD2 (the second conductive member CM2). The driver 10 is configured to perform switching between the first mode as illustrated in FIG. 10A, the second mode as illustrated in FIG. 10B, and the third mode as illustrated in FIG. 10C. Specifically, the first mode is a mode in which the first conductive path CD1, the first wire SA1, the common conductive path CD0, the second wire SA2, and the second conductive path CD2 are electrically connected in series, thereby supplying the current to the first wire SA1 and the second wire SA2, and causing the current to flow from the first point PT1 to the second point PT2 of the first conductive path CD1 (the first conductive member CM1) as indicated by the arrow AR61 in FIG. 12A and causing the current to flow from the second point PT12 to the first point PT11 of the second conductive path CD2 (the second conductive member CM2) as indicated by the arrow AR62 in FIG. 12A. The second mode is a mode in which the first conductive path CD1, the first wire SA1, and the common conductive path CD0 are electrically connected in series, thereby supplying the current to the first wire SAL and causing the current to flow through the first conductive path CD1 (the first conductive member CM1). The third mode is a mode in which the second conductive path CD2, the second wire SA2, and the common conductive path CD0 are electrically connected in series, thereby supplying the current to the second wire SA2 and causing the current to flow through the second conductive path CD2 (the second conductive member CM2). The imaging apparatus 101 is configured to perform the first mode in combination with the second mode, the third mode, or both.

This configuration provides the effect of being able to reduce the magnitude of the magnetic field formed around the conductive path through which the current is supplied to the shape memory alloy wires SA. Therefore, this configuration provides the effect of being able to reduce noise for the imaging element caused by the magnetic field formed around the conductive path.

This is because the magnetic field formed by the current flowing through the first conductive path CD1 is cancelled by the magnetic field formed by the current flowing through the second conductive path CD2. Specifically, in the first mode, the driver 10 is configured such that the current flows in opposite directions through the first conductive path CD1 (first conductive member CM1) and the second conductive path CD2 (second conductive member CM2) that are disposed to extend side by side as illustrated in FIG. 12A, and the magnitude of the current flowing through the first conductive path CD1 (the first conductive member CM1) is the same as the magnitude of the current flowing through the second conductive path CD2 (the second conductive member CM2).

Also, the driver 10 is configured to perform a combined mode in which the first mode is combined with the second mode, the third mode, or both. Thus, the desired quantity of power can be accurately supplied to each of the first wire SA1 and the second wire SA2. The combination of the first mode with the second mode, the third mode, or both is: a combination of the first mode and the second mode; a combination of the first mode and the third mode; or a combination of the first mode, the second mode, and the third mode. In the combined mode in which the first mode is combined with the second mode, the third mode, or both, the operation mode that is to be performed first may be any of the first, second, and third modes, these operation modes may be performed successively, and the measurement time slot or the PWM OFF period may be inserted between these operation modes. Also, the combined mode in which the first mode is combined with the second mode, the third mode, or both may be performed during a period of one or more drive cycles, or may be performed during a period of one or more measurement cycles.

The driver 10 may be configured such that the magnitude of the current flowing in the first mode is larger than the magnitude of the current flowing in each of the second mode and the third mode.

This configuration provides the effect of being able to further reduce the magnetic field (induced magnetic field) that can adversely influence the quality of an image formed by the imaging element. This is because in the first mode, the magnetic field formed by the current flowing through the first conductive path CD1 (the first conductive member CM1) is cancelled by the magnetic field formed by the current flowing through the second conductive path CD2 (the second conductive member CM2). Also, when supplying the desired quantity of power to the first wire SA1, as the magnitude of the current flowing in the first mode becomes greater, the magnitude of the current flowing in the second mode performed after the first mode can be reduced; and as the magnitude of the current flowing in the second mode becomes smaller, the magnetic field formed by the current flowing through the first conductive path CD1 (the first conductive member CM1) in the second mode becomes smaller. Similarly, when supplying the desired quantity of power to the second wire SA2, as the magnitude of the current flowing in the first mode becomes greater, the magnitude of the current flowing in the third mode performed after the first mode; and as the magnitude of the current flowing in the third mode becomes smaller, the magnetic field formed by the current flowing through the second conductive path CD2 (the second conductive member CM2) in the third mode becomes smaller.

Also, the portion connecting the first point PT1 and the second point PT2 on the first conductive path CD1 (the first conductive member CM1) and the portion connecting the first point PT11 and the second point PT12 on the second conductive path CD2 (the second conductive member CM2) may be embedded in the base member 18.

This configuration provides the effect of being able to further reduce the magnetic field (induced magnetic field) that can adversely influence the quality of an image formed by the imaging element. This is because propagation, to the imaging element, of: the magnetic field formed around the portion embedded in the base member 18 of the first conductive member CM1; and the magnetic field formed around the portion embedded in the base member 18 of the second conductive member CM2 is at least partially suppressed by the base member 18.

Also, as illustrated in FIG. 4B, the first wire SA1 and the second wire SA2 may be disposed side by side in a plan view as seen along an optical axis direction (Z-axis direction). Also, as illustrated in FIG. 4A, the first wire SA1 and the second wire SA2 may be disposed so as to cross each other in a side view as seen along a direction (Y-axis direction) that is approximately perpendicular to the extending directions of the first wire SA1 and the second wire SA2 (X-axis direction) and is perpendicular to the optical axis direction (Z-axis direction).

This configuration provides the effect of being able to further reduce the net magnetic field (induced magnetic field) that can adversely influence the quality of an image formed by the imaging element. This is because the induced magnetic field formed around the first wire SA1 is cancelled by the induced magnetic field formed around the second wire SA2 in a state in which the current is supplied simultaneously to the first wire SA1 and the second wire SA2 in the first mode (the state as illustrated in FIG. 7A).

As illustrated in FIG. 5, the base member 18 may have a shape of a rectangular frame including the first side portion 18E1, the second side portion 18E2, the third side portion 18E3, and the fourth side portion 18E4 in a plan view as seen along the optical axis direction (Z-axis direction). As illustrated in FIG. 12A, the first conductive path CD1 (see FIG. 9) may include the first terminal portion TM1, and the second conductive path CD2 (see FIG. 9) may include the second terminal portion TM2. The first terminal portion TM1 and the second terminal portion TM2 may be disposed at the third side portion 18E3, which is one of the first side portion 18E1, the second side portion 18E2, the third side portion 18E3, and the fourth side portion 18E4. In this case, the portion connecting the first point PT1 and the second point PT2 on the first conductive path CD1 (the first conductive member CM1) and the portion connecting the first point PT11 and the second point PT12 on the second conductive path CD2 (the second conductive member CM2) may be disposed to extend side by side along the second side portion 18E2, which is another one of the first side portion 18E1, the second side portion 18E2, the third side portion 18E3, and the fourth side portion 18E4.

This configuration provides the effect of being able to facilitate mounting of the imaging element. A flexible printed circuit board or the like connected to the imaging element can be disposed under the second side 18E2 of the base member 18.

Also, the control method for the imaging apparatus 101 according to the embodiment of the present disclosure includes causing the controller 20 to: control the driver 10 such that the measurement current is supplied to each of the shape memory alloy wires SA at a timing different from the timing at which the driving current is supplied; and obtain resistance values of the shape memory alloy wires SA.

With this control method, the imaging apparatus 101 can more accurately estimate the length of the shape memory alloy wires SA. This is because in this control method, the duration during which the measurement current is continuously supplied is set independently of the duration during which the driving current is continuously supplied. That is, in this control method, the duration during which the measurement current is supplied is set to a necessary and sufficient length.

The control method for the imaging apparatus 101 according to the embodiment of the present disclosure includes causing the driver 10 to perform a combined mode in which the first mode as illustrated in FIG. 10A is combined with the second mode as illustrated in FIG. 10B, the third mode as illustrated in FIG. 10C, or both. Specifically, the first mode is a mode in which the first conductive path CD1, the first wire SA1, the common conductive path CD0, the second wire SA2, and the second conductive path CD2 are electrically connected in series, thereby supplying the current to the first wire SA1 and the second wire SA2, and causing the current to flow from the first point PT1 to the second point PT2 of the first conductive path CD1 (the first conductive member CM1) and causing the current to flow from the second point PT12 to the first point PT11 of the second conductive path CD2 (the second conductive member CM2) as illustrated in FIG. 12A. The second mode is a mode in which the first conductive path CD1, the first wire SA1, and the common conductive path CD0 are electrically connected in series, thereby supplying the current to the first wire SA1 and causing the current to flow through the first conductive path CD1. The third mode is a mode in which the second conductive path CD2, the second wire SA2, and the common conductive path CD0 are electrically connected in series, thereby supplying the current to the second wire SA2 and causing the current to flow through the second conductive path CD2.

With this control method, the imaging apparatus 101 can reduce the magnitude of the magnetic field formed around the conductive path through which the current is supplied to the shape memory alloy wires SA. Therefore, the imaging apparatus 101 can reduce noise for the imaging element caused by the magnetic field formed around the conductive path.

The embodiments of the present invention have been described above in detail. However, the present invention is not limited to the embodiments as described above. Various modifications, substitutions, and the like are applicable to the embodiments as described above without departing from the scope of the present invention. In addition, the features as described with reference to the embodiments as described above may be combined as appropriate if there is no technical contradiction.

The imaging apparatus as described above can reduce the magnitude of the magnetic field formed around the conductive path through which the current is supplied to the shape memory alloy wires.

What is claimed is:

1. An imaging apparatus, comprising
a fixed member including a fixed base;
a movable member that is movable relative to the fixed member, the movable member including a lens holder configured to hold a lens body so as to face an imaging element;
a first shape memory alloy wire in which one end of the first shape memory alloy wire is fixed to the fixed member and another end of the first shape memory alloy wire is fixed to the movable member;
a second shape memory alloy wire in which one end of the second shape memory alloy wire is fixed to the fixed member and another end of the second shape memory alloy wire is fixed to the movable member;
a first conductive path that is provided at the fixed base and electrically connected to the one end of the first shape memory alloy wire;

a second conductive path that is provided at the fixed base and electrically connected to the one end of the second shape memory alloy wire;
a common conductive path that is electrically connected to the another end of the first shape memory alloy wire and the another end of the second shape memory alloy wire; and
a driver configured to be electrically connected to the first conductive path, the second conductive path, and the common conductive path, and supply a current to the first shape memory alloy wire and the second shape memory alloy wire and drive the first shape memory alloy wire and the second shape memory alloy wire, wherein
a portion connecting a first point and a second point on the first conductive path and a portion connecting a first point and a second point on the second conductive path are disposed to extend side by side in the fixed base,
the first point on the first conductive path is disposed side by side with the first point on the second conductive path,
the second point on the first conductive path is disposed side by side with the second point on the second conductive path,
the driver is configured to perform switching between a first mode, a second mode, and a third mode,
the first mode being a mode in which the first conductive path, the first shape memory alloy wire, the common conductive path, the second shape memory alloy wire, and the second conductive path are electrically connected in series, thereby supplying a current to the first shape memory alloy wire and the second shape memory alloy wire, and causing the current to flow from the first point of the first conductive path to the second point of the first conductive path and causing the current to flow from the second point of the second conductive path to the first point of the second conductive path,
the second mode being a mode in which the first conductive path, the first shape memory alloy wire, and the common conductive path are electrically connected in series, thereby supplying a current to the first shape memory alloy wire and causing the current to flow through the first conductive path, and
the third mode being a mode in which the second conductive path, the second shape memory alloy wire, and the common conductive path are electrically connected in series, thereby supplying a current to the second shape memory alloy wire and causing the current to flow through the second conductive path, and
the imaging apparatus is configured to perform the first mode in combination with the second mode, the third mode, or both.

2. The imaging apparatus according to claim 1, wherein a magnitude of the current flowing in the first mode is greater than a magnitude of the current flowing in the second mode and a magnitude of the current flowing in the third mode.

3. The imaging apparatus according to claim 1, wherein the portion connecting the first point and the second point on the first conductive path and the portion connecting the first point and the second point on the second conductive path are embedded in the fixed base.

4. The imaging apparatus according to claim 1, wherein the first shape memory alloy wire and the second shape memory alloy wire are disposed side by side in a plan view as seen along an optical axis direction, and the first shape memory alloy wire and the second shape memory alloy wire are disposed so as to cross each other in a side view as seen along a direction that is approximately perpendicular to extending directions of the first shape memory alloy wire and the second shape memory alloy wire and is perpendicular to the optical axis direction.

5. The imaging apparatus according to claim 1, wherein the fixed base has a shape of a rectangular frame including a first side portion, a second side portion, a third side portion, and a fourth side portion in a plan view as seen along an optical axis direction, the first conductive path includes a first terminal portion, the second conductive path includes a second terminal portion, the first terminal portion and the second terminal portion are disposed at one side portion selected from the group consisting of the first side portion, the second side portion, the third side portion, and the fourth side portion, and the portion connecting the first point and the second point on the first conductive path and the portion connecting the first point and the second point on the second conductive path are disposed to extend side by side along another one side portion selected from the group consisting of the first side portion, the second side portion, the third side portion, and the fourth side portion.

6. A camera module, comprising:

the imaging apparatus of claim 1; and the lens body.

7. A control method for an imaging apparatus that includes a fixed member including a fixed base, a movable member that is movable relative to the fixed member, the movable member including a lens holder configured to hold a lens body so as to face an imaging element, a first shape memory alloy wire in which one end of the first shape memory alloy wire is fixed to the fixed member and another end of the first shape memory alloy wire is fixed to the movable member, a second shape memory alloy wire in which one end of the second shape memory alloy wire is fixed to the fixed member and another end of the second shape memory alloy wire is fixed to the movable member, a first conductive path that is provided at the fixed base and electrically connected to the one end of the first shape memory alloy wire, a second conductive path that is provided at the fixed base and electrically connected to the one end of the second shape memory alloy wire, a common conductive path that is electrically connected to the another end of the first shape memory alloy wire and the another end of the second shape memory alloy wire, and a driver configured to be electrically connected to the first conductive path, the second conductive path, and the common conductive path, and supply a current to the first shape memory alloy wire and the second shape memory alloy wire and drive the first shape memory alloy wire and the second shape memory alloy wire, a portion connecting a first point and a second point on the first conductive path and a portion connecting a first point and a second point on the second conductive path being disposed to extend side by side in the fixed base, the first point on the first conductive path being disposed side by side with the first point on the second conductive path, and the second point on the first conductive path being disposed side by side with the second point on the second conductive path, the control method comprising:

causing the driver to perform a combined mode in which a first mode is combined with a second mode, a third mode, or both, the first mode being a mode in which the first conductive path, the first shape memory alloy wire, the common conductive path, the second shape memory alloy wire, and the second conductive path are electrically connected in series, thereby supplying a current to the first shape memory alloy wire and the second shape memory alloy wire, and causing the current to flow from the first point of the first conductive path to the second point of the first conductive path and causing the current to flow from the second point of the second conductive path to the first point of the second conductive path, the second mode being a mode in which the first conductive path, the first shape memory alloy wire, and the common conductive path are electrically connected in series, thereby supplying a current to the first shape memory alloy wire and causing the current to flow through the first conductive path, and the third mode being a mode in which the second conductive path, the second shape memory alloy wire, and the common conductive path are electrically connected in series, thereby supplying a current to the second shape memory alloy wire and causing the current to flow through the second conductive path.

* * * * *